United States Patent
Takeuchi et al.

(10) Patent No.: US 9,462,050 B2
(45) Date of Patent: Oct. 4, 2016

(54) TERMINAL DEVICE, PRINTER AND STORAGE MEDIUM

(71) Applicants: Shun Takeuchi, Nagoya (JP); Sunao Kawai, Nagoya (JP)

(72) Inventors: Shun Takeuchi, Nagoya (JP); Sunao Kawai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/166,888

(22) Filed: Jan. 29, 2014

(65) Prior Publication Data

US 2014/0211253 A1 Jul. 31, 2014

(30) Foreign Application Priority Data

Jan. 29, 2013 (JP) ................... 2013-014869

(51) Int. Cl.
*H04L 29/08* (2006.01)
*G06F 3/12* (2006.01)
*G06K 15/00* (2006.01)
*H04W 4/02* (2009.01)

(52) U.S. Cl.
CPC ......... *H04L 67/1021* (2013.01); *G06F 3/1203* (2013.01); *G06F 3/126* (2013.01); *G06F 3/1226* (2013.01); *G06F 3/1231* (2013.01); *G06F 3/1292* (2013.01); *H04L 67/18* (2013.01); *G06K 15/40* (2013.01); *H04W 4/02* (2013.01)

(58) Field of Classification Search
None
See application file for complete search history.

(56) References Cited

U.S. PATENT DOCUMENTS

| 8,688,144 B1* | 4/2014 | Alexander | 455/456.3 |
| 2004/0083210 A1* | 4/2004 | Ochiai et al. | 707/3 |
| 2008/0200118 A1* | 8/2008 | Kubo et al. | 455/14 |
| 2011/0063670 A1* | 3/2011 | Ito | G06F 3/1204 358/1.15 |
| 2012/0077515 A1* | 3/2012 | Oishi | 455/456.1 |

FOREIGN PATENT DOCUMENTS

JP 2009-277084 A 11/2009

\* cited by examiner

*Primary Examiner* — Huo Long Chen
(74) *Attorney, Agent, or Firm* — Banner & Witcoff, Ltd.

(57) ABSTRACT

A terminal device configured to support selection of a printer, the terminal device including: a first processor; and a first memory storing instructions that, when executed by the processor, causes the terminal device to perform: registering area information which defines an area including a location of a printer and is for associating the area with the printer located in the area; acquiring the registered area information; acquiring terminal position information which represents the position of the terminal device; and specifying a candidate of a printer to be used based on the area information and the terminal position information, wherein the area is defined based on three or more positions.

11 Claims, 19 Drawing Sheets

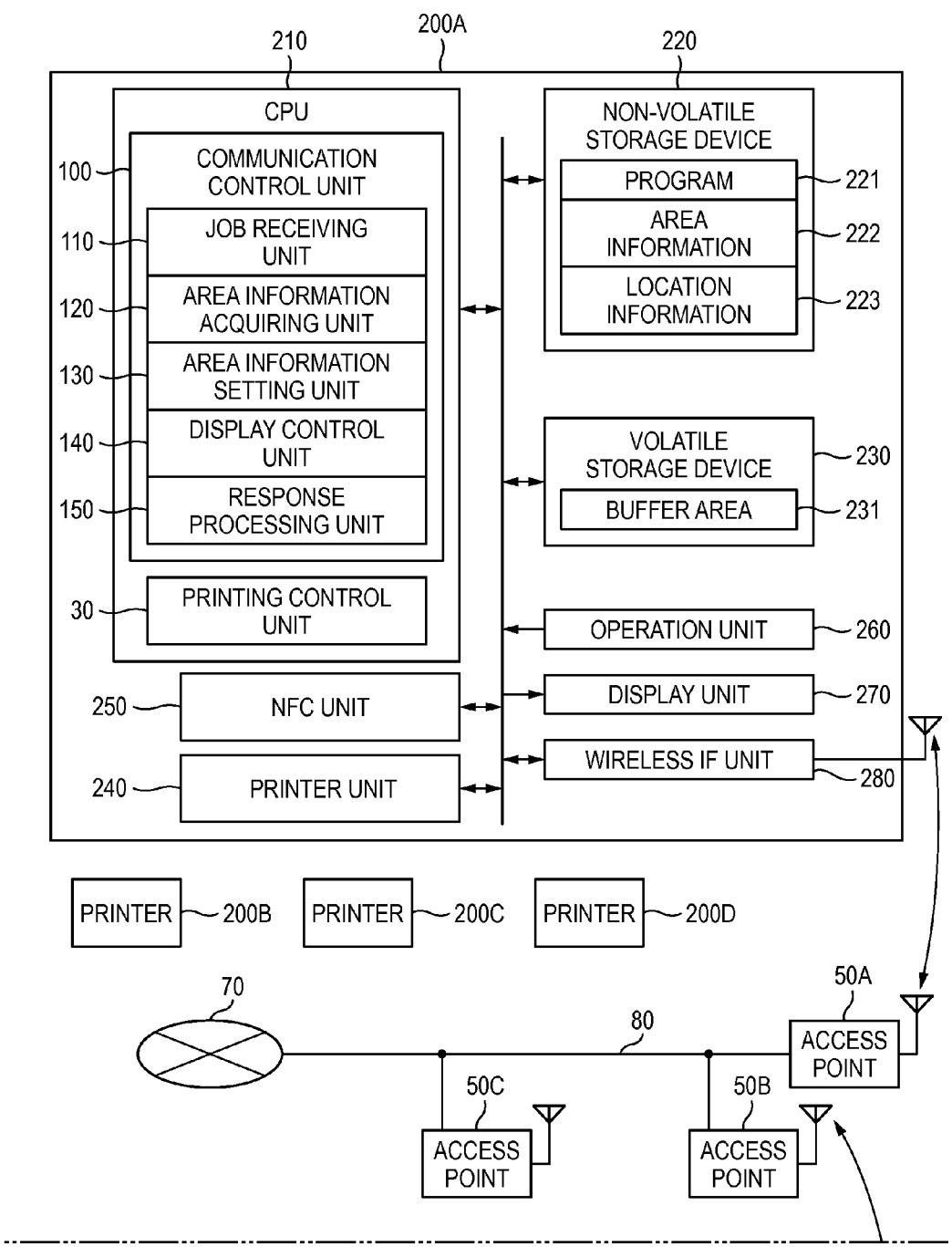

POSITION INFORMATION REGISTERING PROCESS

AREA INFORMATION REGISTERING PROCESS

AREA INFORMATION SETTING PROCESS

SPECIFICATION INFORMATION ACQUIRING PROCESS

FIG. 13A
SPECIFICATION INFORMATION OF PRINTER 200A

SDa

| | |
|---|---|
| DUPLEX PRINTING | POSSIBLE |
| COLOR PRINTING | IMPOSSIBLE |
| A3 PRINTING | IMPOSSIBLE |
| ⋮ | ⋮ |

FIG. 13B
SPECIFICATION INFORMATION OF PRINTER 200B

SDb

| | |
|---|---|
| DUPLEX PRINTING | IMPOSSIBLE |
| COLOR PRINTING | IMPOSSIBLE |
| A3 PRINTING | IMPOSSIBLE |
| ⋮ | ⋮ |

FIG. 13C
SPECIFICATION INFORMATION OF PRINTER 200C

SDc

| | |
|---|---|
| DUPLEX PRINTING | IMPOSSIBLE |
| COLOR PRINTING | POSSIBLE |
| A3 PRINTING | POSSIBLE |
| ⋮ | ⋮ |

FIG. 13D
SPECIFICATION INFORMATION OF PRINTER 200D

SDd

| | |
|---|---|
| DUPLEX PRINTING | POSSIBLE |
| COLOR PRINTING | IMPOSSIBLE |
| A3 PRINTING | POSSIBLE |
| ⋮ | ⋮ |

FIG. 13E
SPECIFICATION-PER-AREA INFORMATION

ASD

| ROOM 1 | | ROOM 2 | |
|---|---|---|---|
| DUPLEX PRINTING | POSSIBLE | DUPLEX PRINTING | POSSIBLE |
| COLOR PRINTING | POSSIBLE | COLOR PRINTING | IMPOSSIBLE |
| A3 PRINTING | POSSIBLE | A3 PRINTING | POSSIBLE |
| ⋮ | ⋮ | ⋮ | ⋮ |

PRINTING PROCESS

SECOND EMBODIMENT

AREAS A1 AND A2: AREAS FOR MONOCHROME PRINTERS
AREA A3: AREA FOR COLOR PRINTERS

PRINTER 200C IS A COLOR/MONOCHROME PRINTER
PRINTERS 200A, 200B, AND 200D ARE MONOCHROME PRINTERS

TERMINAL DEVICE, PRINTER AND STORAGE MEDIUM

CROSS-REFERENCE TO RELATED APPLICATIONS

This application claims priority from Japanese Patent Application No. 2013-014869 filed on Jan. 29, 2013, the entire contents of which are incorporated herein by reference.

TECHNICAL FIELD

Aspects of the present invention relate to control of a terminal device, and particularly, to a technology for controlling a terminal device capable of communication with a printing apparatus.

BACKGROUND

There is known a technology for selecting a printer for performing printing, according to the position of a user when the user issues a print instruction. For example, in related-art, a server uses an IC card, which a user carries, to manage entrance and exit of the user, thereby grasping an area (a conference room, a living room, or the like) where the user is positioned. When receiving a print instruction from the user, the server selects a printer disposed in the area where the user is positioned or in an area close to the area where the user is positioned, and performs control such that the corresponding printer performs printing. As a result, the user can cause a relatively close printer among a plurality of printers to perform printing.

SUMMARY

As described above, there has been required a technology for supporting a user to select a printer.

An object of the present invention is to provide a technology for supporting a user to be able to select an appropriate printer by using a terminal device.

According to an aspect of the present invention, there is provided a terminal device configured to support selection of a printer, the terminal device including: a first processor; and a first memory storing instructions that, when executed by the processor, cause the terminal device to perform: registering area information which defines an area including a location of a printer and is for associating the area with the printer located in the area; acquiring the registered area information; acquiring terminal position information which represents the position of the terminal device; and specifying a candidate of a printer to be used based on the area information and the terminal position information, wherein the area is defined based on three or more positions.

According to another aspect of the present invention, there is provided a specific printer configured to perform communication with the above-described terminal device, the specific printer including: a second processor; and a second memory storing instructions that, when executed by the processor, cause the specific printer to perform: acquiring area information corresponding to another printer which is different from the specific printer and has already registered the area information therein; and setting the area information corresponding to the another printer as area information corresponding to the specific printer, when the specific printer is located in an area defined by the area information corresponding to the another printer.

According to another aspect of the present invention, there is provided a non-transitory computer-readable storage medium storing computer-readable instructions, when executed by a processor, causing a terminal device configured to support selection of a printer to perform: registering area information which defines an area including a location of a printer and is for associating the area with the printer located in the area; acquiring the registered area information; acquiring terminal position information which represents the position of the terminal device; and specifying a candidate of a printer to be used based on the area information and the terminal position information, wherein the area is defined based on three or more positions.

BRIEF DESCRIPTION OF DRAWINGS

FIGS. 13A to 13E are views illustrating examples of specification information;

DETAILED DESCRIPTION

A. First Embodiment

A-1. System Configuration

Figure 1B:
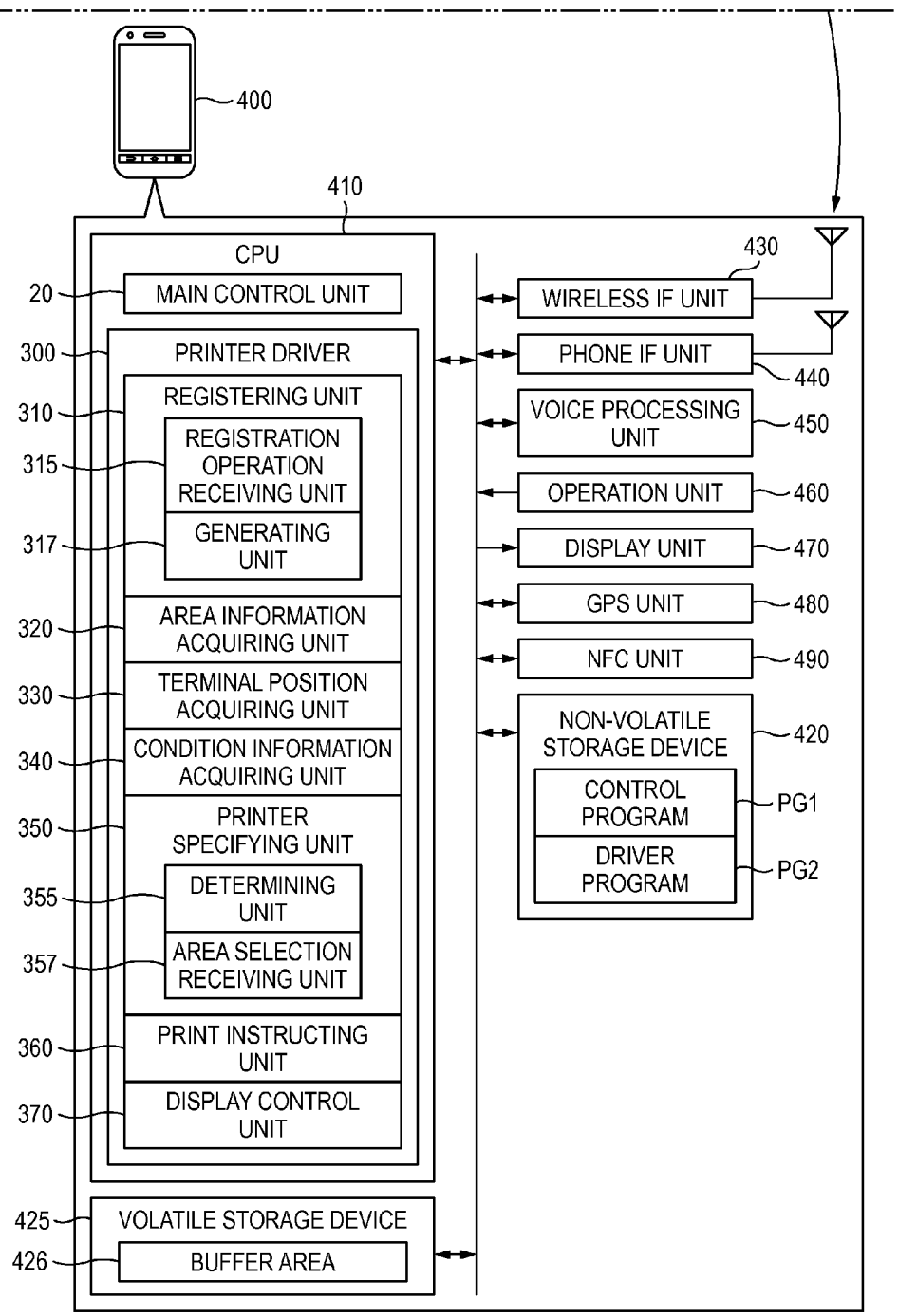
FIG. 1 (1A and 1B) is a block diagram illustrating the configuration of a system including a terminal device according to an embodiment.

Hereinafter, aspects of the present invention will be described based on the following embodiments. FIG. 1 (1A and 1B) is a block diagram illustrating the configuration of a system including a portable terminal as a terminal device in the embodiment. This system includes a plurality of printers 200A to 200D, a local area network (LAN) 80 connected to the Internet 70, a plurality of access points 50A to 50C connected to the LAN 80, and a portable terminal 400 which a user carries.

Figure 2:
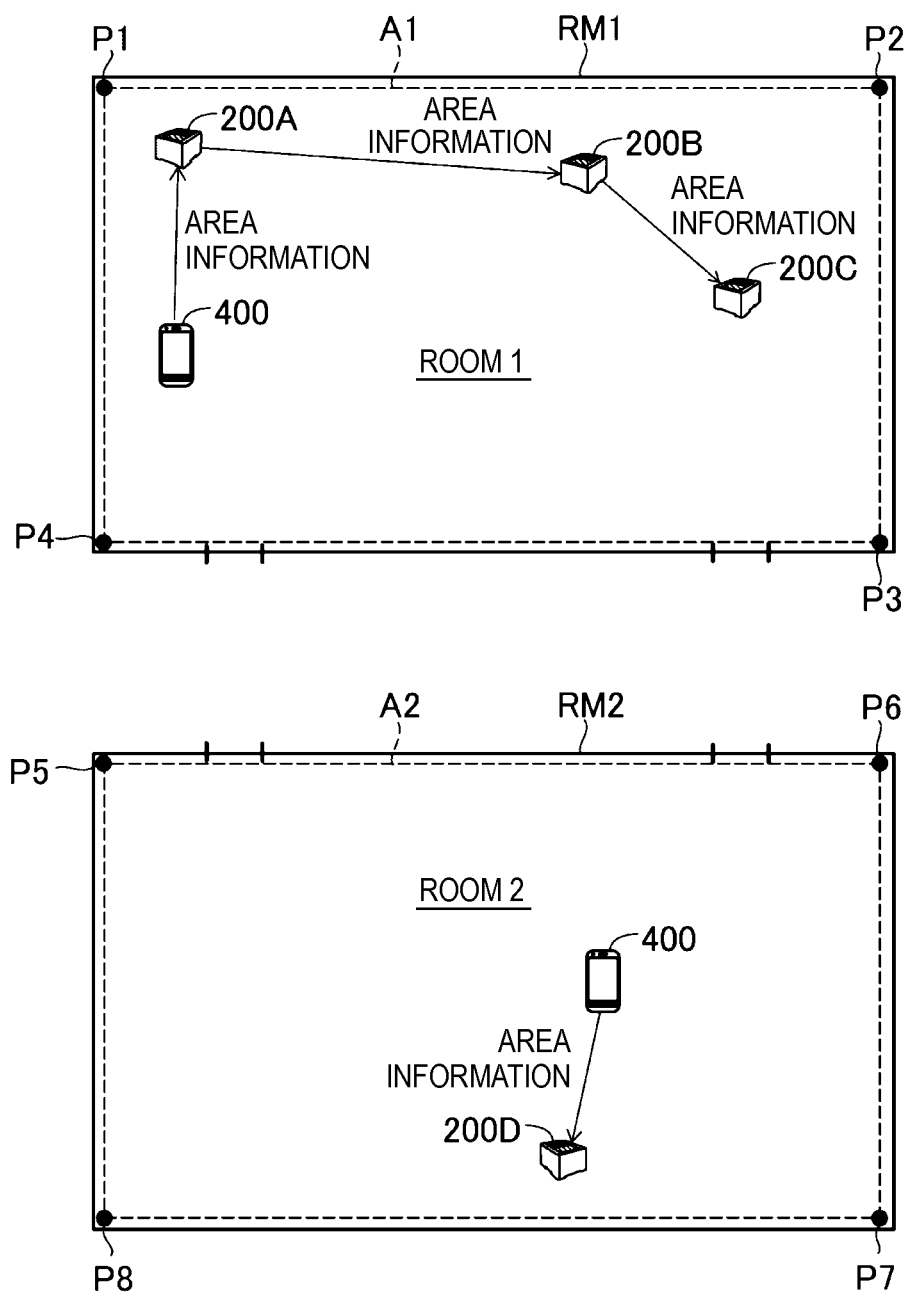
FIG. 2 is a diagram illustrating an example of location of a plurality of printers 200A to 200D.

FIG. 2 is a diagram illustrating an example of a location of the plurality of printers 200A to 200D. As shown in FIG. 2, three printers 200A to 200C are dispersively disposed in a first room RM1 (for example, an office room). One printer 200D is disposed in a second room RM2. Each user can use a portable terminal 400 of the corresponding user to transmit a print instruction with respect to any of the plurality of printers 200A to 200D.

Each of the access points 50A to 50C is a wireless LAN switch which functions as an access point of a wireless LAN using a communication system defined, for example, by a standard such as IEEE 802.11a, 802.11b, 802.11g, or 802.11n. The plurality of printers 200A to 200D and the terminal devices 400 can perform wireless communication using an infrastructure mode, through the access points 50A to 50C. The infrastructure mode is a mode in which a plurality of wireless LAN terminal devices performs data communication through access points. As a result, the plurality of printers 200A to 200D and the terminal devices 400 can be treated as network devices connected to the LAN 80.

The LAN 80 is, for example, a wired network built inside a building including the two rooms RM1 and RM2 of FIG. 2, based on Ethernet (registered as a trademark). The access points 50A to 50C are dispersively disposed, for example, inside the building including the rooms RM1 and RM2, thereby establishing a wireless network (not shown in FIG. 2). As a result, at an arbitrary place inside the building including the rooms RM1 and RM2, the portable terminal 400 can access the LAN 80 through the wireless network.

The printer 200A includes a CPU 210, a non-volatile storage device 220 such as a hard disk drive or a flash memory, a volatile storage device 230 such as a RAM, a printer unit 240 which is a print engine for printing images by a predetermined system (for example, an inkjet system or a laser system), a near field communication (NFC) unit 250 that performs communication with an external device by use of NFC, an operation unit 260 such as a touch panel or buttons, a display unit 270 including a display panel such as a liquid crystal panel superimposed on a touch panel, and a wireless IF unit 280 which is an interface for performing communication with an external device such as a personal computer or a portable terminal.

The volatile storage device 230 includes a buffer area 231 for temporarily storing a variety of intermediate data which is generated when the CPU 210 performs processes. The non-volatile storage device 220 stores a computer program 221 for controlling the printer 200A, area information 222, and location information 223.

The computer program 221 is, for example, stored in the non-volatile storage device 220 in advance when shipping the printer 200A. Also, the computer program 221 can be downloaded from a CD-ROM or the like having the corresponding computer program recorded therein, or from a server.

Figures 3A, 3B:
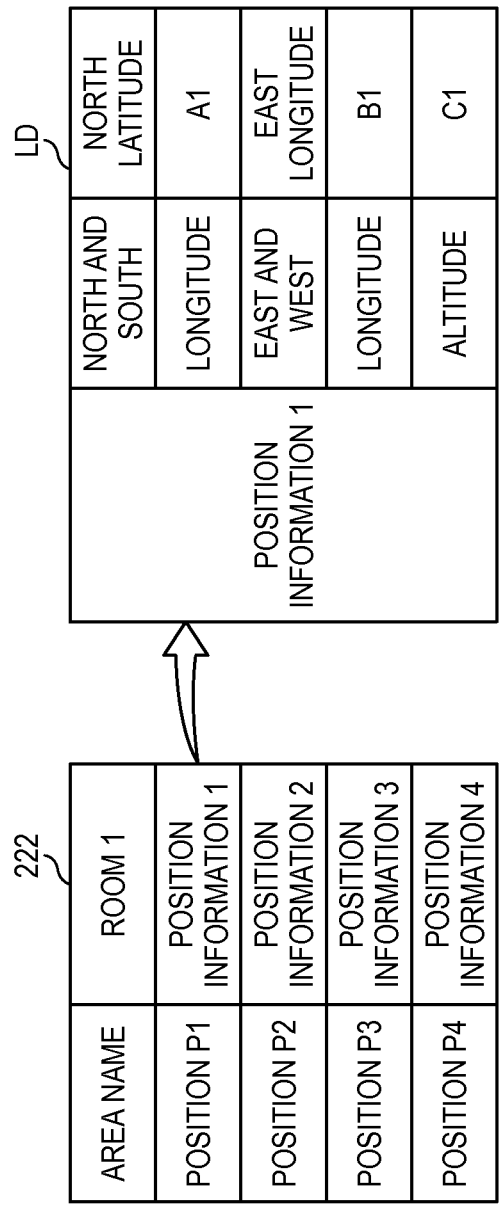
FIGS. 3A and 3B are views illustrating examples of area information and location information 223, respectively.

FIGS. 3A and 3B are views illustrating examples of the area information and the location information 223, respectively. The area information 222 of the printer 200A is information defining a first area A1 shown in FIG. 2. The area information 222 is registered in the non-volatile storage device 220 by an area information registering process (FIG. 6) or an area information setting process (FIG. 9) to be described later. The first area A1 is an area covering the whole of the first room RM1, and is an area including three printers 200A to 200C. The first area A1 is defined by four pieces of position information 1 to 4 representing four positions P1 to P4. Specifically, the first area A1 is a quadrangular area which is obtained by connecting the four positions P1 to P4 in this order. That is, the first area A1 is a quadrangular area having the four positions P1 to P4 as apexes. The area information 222 of FIG. 3A includes the position information 1 to 4, and information representing the name of the area (for example, "ROOM 1"). As shown with respect to a position information 1 in FIG. 3A, each of the position information 1 to 4 is three-dimensional coordinate information LD including information representing a latitude (a north latitude or a south latitude), a longitude (an east longitude or a west longitude), and a height (an altitude), respectively.

The location information 223 is position information representing the location of the printer 200A (FIG. 3B). Similarly to the above described position information 1 to 4, the location information is three-dimensional coordinate information LD including information representing a latitude, a longitude, and a height, respectively. The location information 223 is stored in the non-volatile storage device 220 by a location registering process (FIG. 4) to be described later.

The CPU 210 controls the whole of the printer 200A by executing the computer program 221. Specifically, the CPU 210 functions, for example, as a printing control unit 30 which controls the printer unit 240 for performing printing, and a communication control unit 100 which performs a communication process with the portable terminal 400. The communication control unit 100 includes a job receiving unit 110, an area information acquiring unit 120, an area information setting unit 130, a display control unit 140, and a response processing unit 150. The job receiving unit 110 receives print jobs from the portable terminals 400. The area information acquiring unit 120 acquires area information 222 from the portable terminal 400 or another printer. The area information setting unit 130 performs a process for setting the area information 222, acquired from the portable terminal 400 or the other printer, as the area information of the printer 200A. The display control unit 140 displays user interface images on the display unit 270 in a variety of processes to be described later. The response processing unit 150 responds to inquiries or requests from the portable terminals 400 and other printers in a variety of processes to be described later. Specific processes which these functional units perform will be described later.

The wireless IF unit 280 includes an antenna, and performs, for example, wireless communication through the access points 50A to 50C, that is, wireless communication based on the infrastructure mode. The wireless IF unit 280 is usable, for example, for data communication with the portable terminals 400 and other printers, as will be described later. Hereinafter, data communication (for example, transmission and reception of a print job, or transmission and reception of the area information 222) without a communication method being specified is performed by use of wireless communication through the access points 50A to 50C.

The other printers 200B to 200D have the same configuration as that of the above described printer 200A, and thus will not be described in detail. However, the location information 223 of each of the printers 200B to 200D is position information representing the location of the corresponding printer. Also, the area information 222 of each of the printers 200B and 200C is information defining the first area A1 of FIG. 2, similarly to the area information 222 of the printer 200A. Further, the area information 222 of the printer 200D is information defining a second area A2 of FIG. 2. The second area A2 is defined by four pieces of position information representing the four positions P5 to P8, respectively. Hereinafter, when each of the printers 200A to 200D is not distinguished from the others, the alphabet of the end of the reference symbol of the corresponding printer is omitted, and the corresponding printer is denoted by a reference symbol "200".

The portable terminal 400 is, for example, a multi-function portable phone called a smart phone. The portable terminal 400 mainly includes a CPU 410, a non-volatile storage device 420 such as a hard disk drive or a flash memory, a volatile storage device 425 such as a RAM, a wireless IF unit 430, a phone IF unit 440, a voice processing unit 450 for implementing a variety of phone functions such as a speaker or a microphone, an operation unit 460 including a touch panel or operation keys, a display unit 470 including a variety of components such as a liquid crystal panel superimposed on a touch panel, a GPS unit 480, and an NFC unit 490 for performing communication with an external device by use of NFC.

The radio IF unit 430 includes an antenna, and performs, for example, wireless communication through the access points 50A to 50C, that is, wireless communication based on the infrastructure mode. For example, the wireless IF unit 430 can be used for transmission of a print job to a printer 200, or communication of a variety of information with a printer 200 as will be described below.

The phone IF unit 440 includes an antenna, and performs wireless communication with a base station (not shown) based on a portable phone communication system (for example, W-CDMA). The phone IF unit 440 can be used, for example, for connection with a phone or connection with the Internet 70 through a base station (not shown).

The GPS unit 480 includes a receiver for receiving an electric wave (GPS signal) transmitted from a satellite constituting a global positioning system (GPS). The GPS unit 480 can acquire position information representing a current position (a latitude, a longitude, and a height) based on a received GPS signal.

The volatile storage device 425 includes a buffer area 426 for temporarily storing a variety of intermediate data which is generated when the CPU 410 performs processes.

The non-volatile storage device 420 stores a control program PG1 and a printer driver program PG2. The control program PG1 is a program for implementing basic functions of the portable terminal 400 such as an operating system (OS) function, a phone function, and a function of controlling the GPS unit 480 and the NFC unit 490. The control program PG1 may be provided by the manufacturer of the portable terminal 400, and be stored in advance during shipment. The printer driver program PG2 is a program for implementing a function for remotely operating the printer units 240 of the printers 200. The printer driver program PG2 is a program (also referred to as an application) for adding a new function to the portable terminal 400, and may be provided by a provider (for example, the manufacturer of the printers 200) different from the manufacturer of the portable terminal 400 such that it is downloadable from a predetermined server. Also, the printer driver program PG2 may be provided, for example, by the manufacturer of the portable terminal 400, and be stored in advance during shipment.

The CPU 410 executes the control program PG1, thereby functioning as a main control unit 20 for implementing the basic functions of the portable terminal 400. Also, the CPU 410 executes the printer driver program PG2, thereby functioning as a printer driver 300. The printer driver 300 can use the area information 222 to perform a process of supporting selection of a printer to be used, as will be described in detail. The printer driver 300 includes a registering unit 310, an area information acquiring unit 320, a terminal position acquiring unit 330, a condition information acquiring unit 340, a printer specifying unit 350, a print instructing unit 360, and a display control unit 370.

Prior to a print instruction, the registering unit 310 registers the location information 223 and the area information 222 in each of the plurality of printers 200A to 200D, respectively. The registering unit 310 includes a registration operation receiving unit 315 for receiving a predetermined registration operation from the user, and a generating unit 317 for generating area information defining an area based on three or more positions.

The area information acquiring unit 320 acquires the area information 222 from the plurality of printers 200A to 200D in a printing process. The terminal position acquiring unit 330 acquires terminal position information representing the position of the portable terminal 400. The condition information acquiring unit 340 acquires condition information representing printing conditions which the printers associated with the area defined by the area information can execute.

The printer specifying unit 350 specifies a candidate for a printer to be used, specifically, candidate for a printer to be instructed to perform printing. The printer specifying unit 350 includes a determining unit 355 and an area selection receiving unit 357. The determining unit 355 determines whether the portable terminal 400 is in the area defined by the area information 222, based on the area information 222 and the terminal position information. The area selection receiving unit 357 receives selection of one area of the plurality of areas defined by the plurality of pieces of area information 222.

When the portable terminal 400 is in an area defined by the area information 222, the print instructing unit 360 instructs a printer located in the area to perform printing. When the portable terminal 400 is not positioned in the area defined by the area information 222, the display control unit 370 controls the display unit 470 such that the display unit 470 displays printer-related information related to printers which can be instructed to perform printing by using the portable terminal 400. The printer-related information is, for example, information for enabling the user to select a printer to be instructed to perform printing.

A-2. System Operation

A-2-1. Registration of Location Information

Figure 4:
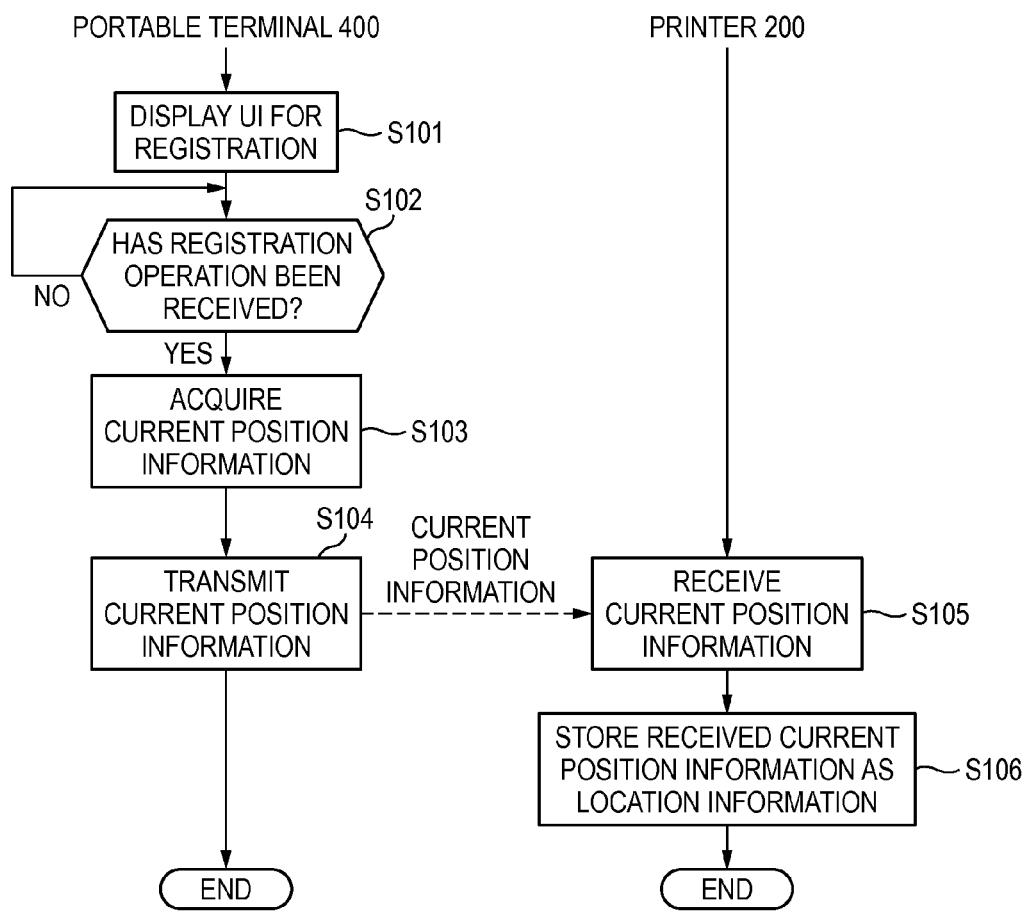
FIG. 4 is a flow chart of a position information registering process.

A position information registering process of registering the location information 223, which is to be used in a variety of processes to be described later (the area information registering process, the area information setting process, and a printing process), in each of the plurality of printers 200A to 200D included in the system will be described. FIG. 4 is a flow chart of the position information registering process. The position information registering process can be performed by the registering unit 310 (FIG. 1) of the portable terminal 400 and the communication control unit 100 (FIG. 1) of the printer 200. For example, when the printer 200 is installed, the position information registering process is started by a start instruction of the user. Specifically, the user activates the printer driver 300 and selects a registration mode for performing the position information registering process, thereby starting a process of the portable terminal 400 side. Also, the user selects the registration mode for performing the position information registering process, through the operation unit 260 of the printer 200, thereby starting a process of the printer 200 side. This position information registering process is a process for registering one area information 222 in one printer 200, and is performed one time with respect to each printer 200 included in the system. For example, after one printer 200 is installed, the position information registering process needs only to be performed one time, and unless the corresponding printer 200 is moved, the position information registering process does not need to be performed a plurality of times. For this reason, for example, when there is a plurality of users, one user, for example, a person in charge of managing the printers 200 may use one portable terminal 400 to perform the position information registering process.

In STEP S101 of FIG. 4, the registering unit 310 displays an UI image RG for position registration on the display unit 470 of the portable terminal 400.

Figure 5:
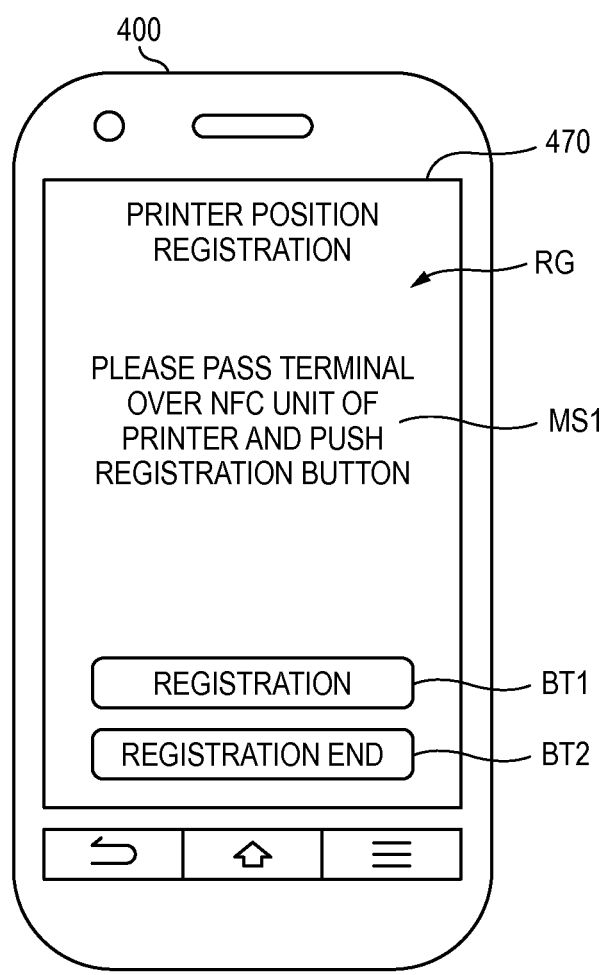
FIG. 5 is a diagram illustrating an example of an UI image RG for position registration.

FIG. 5 is a diagram illustrating an example of the UI image RG for position registration. A UI image RG for position registration shown in FIG. 5 includes a message MS1, a registration button BT1, and an end button BT2. The message MS1 is a message for urging the user to pass the portable terminal 400 over the NFC unit 250 of the printer 200 and push the registration button BT1.

In STEP S102, the registration operation receiving unit 315 determines whether a registration operation of the user, that is, pushing of the registration button BT1 has been received. When the registration operation has not been received ("NO" in STEP S102), the registration operation receiving unit 315 waits for the registration operation to be received. When the registration operation has been received ("YES" in STEP S102), that is, when the registration button BT1 has been pushed by the user, in STEP S103, the registering unit 310 acquires a current position information representing the current position of the portable terminal 400 by use of the GPS unit 480. However, the present invention is not limited to whether the registration operation has been received. When it is detected by the registering unit 310 that the portable terminal 400 has been positioned in the vicinity of the NFC unit 250 of the printer 200, whereby the portable terminal 400 and the printer 200 have transitioned to a state of being capable of communication using NFC, the registering unit 310 may automatically acquire the current position information LD representing the current position of the portable terminal 400. In this case, the registering unit 310 does not necessarily need to display the registration button BT1 in the UI image RG for position registration shown in FIG. 5. It is necessary that the registering unit 310 displays a message for urging the user to pass the portable terminal 400 over the NFC unit 250 of the printer 200, in the UI image RG for position registration. In general, regardless of whether the registration operation is received or a transition to a state of being capable of communication is detected by the registering unit 310, the registering unit 310 needs to acquire the current position information LD representing the current position of the portable terminal 400 in the state where the terminal 400 and the printer 200 can perform communication using NFC. The acquired current position information is coordinate information iLD (FIG. 3A) including information representing a latitude, a longitude, and a height, respectively, as described above.

At the time when STEP S103 is performed, the portable terminal 400 is in the vicinity of the NFC unit 250 of the printer 200. Therefore, the current position information (coordinate information LD) which is acquired in STEP S103 represents the location of the printer 200.

In STEP S104, the registering unit 310 transmits the current position information, acquired in STEP S103, to the printer 200 by near field communication using the NFC unit 490 of the portable terminal 400. In STEP S105, the communication control unit 100 of the printer 200 receives the current position information through the NFC unit 250.

In STEP S106, the communication control unit 100 stores the received current position information, as the location information 223 (FIG. 1) representing the location of the printer 200, in the non-volatile storage device 220.

Due to the above described position information registering process, even if the printer 200 has no GPS receiver, the user can easily register the location information 223 in the printer 200. Also, in a state where the portable terminal 400 is in the vicinity of the NFC unit 250 of the printer 200, that is, in a state where the printer 200 and the portable terminal 400 can perform communication using NFC, in STEP S3, the registering unit 310 acquires the current position information which needs to be stored as the location information 223. Therefore, it is possible to store the location information 223 exactly representing the location of the printer 200, in the printer 200.

Prior to the area information registering process to be subsequently described, the position information registering process is performed with respect to each of the plurality of printers 200A to 200D (FIG. 2), and the location information 223 is stored in each of the plurality of printers 200A to 200D (FIG. 2).

Also, at the time of starting the above described position information registering process, the user selects the registration mode for performing the position information registering process, through the operation unit 260 of the printer 200, thereby starting the process of the printer 200 side. Alternatively, the process of the printer side may be started when the current position information is received from the portable terminal 400 in the above described STEP S105. In this case, it is preferable that the registering unit 310 of the portable terminal 400 transmits a command for requesting the printer 200 to register the current position information, in addition to the current position information, to the printer 200 in STEP S104. In this case, it is possible to reduce the operation burden of the user.

A-2-2. Area Information Registering Process

Figure 6:
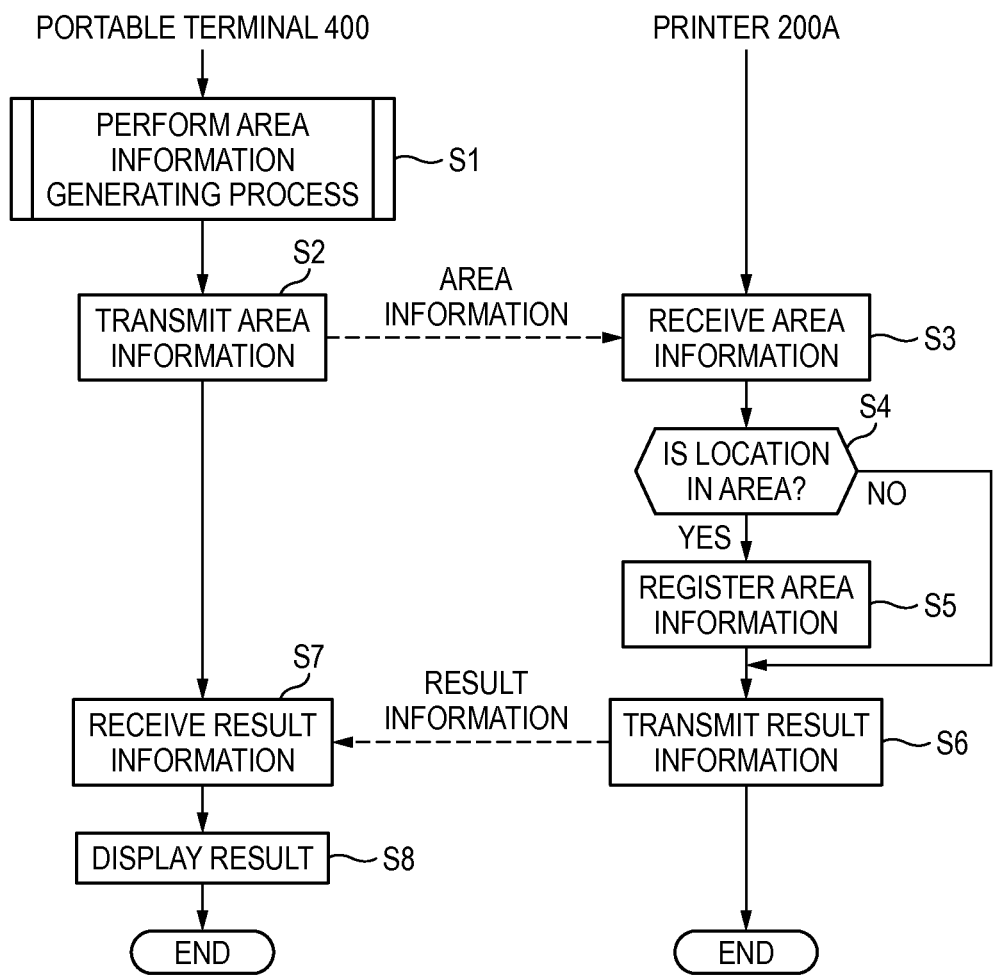
FIG. 6 is a flow chart of an area information registering process.

As processes of registering the area information 222 to be used in a specification information acquiring process and a printing process, in the plurality of printers 200A to 200D included in the system, the area information registering process and the area information setting process are prepared. By any one of these two processes, the area information 222 can be registered in each of the plurality of printers 200A to 200D. First, the area information registering process will be described. FIG. 6 is the flow chart of the area information registering process. The area information registering process is performed by the registering unit 310 (FIG. 1) of the portable terminal 400 and the communication control unit 100 (FIG. 1) of a printer 200. For example, when the printer 200 is installed, after the above described position information registering process, the area information registering process is started in response to an instruction of the user. Also, similarly to the position information registering process, the area information registering process needs only to be performed one time after the printer 200 is installed. For this reason, similarly to the position information registering process, for example, when there is a plurality of users, a person in charge of managing the printer 200 may use one portable terminal 400 to perform the area information registering process.

Here, the differences between the position information registering process of FIG. 3 and the area information registering process of FIG. 6 will be described. The position information registering process of FIG. 3 is a process for registering the location information 223 (FIG. 3A) in the printer 200 as described above. Therefore, the location information 223 (FIG. 3A), that is, a position information representing one position which is the location of the printer 200 is transmitted from the portable terminal 400 to the printer 200. In contrast to this, the area information registering process of FIG. 6 is a process for registering the area information 222 (FIG. 3B) in the printer 200. Therefore, the area information 222 (FIG. 3B), that is, the position information representing three or more positions defining an area (for example, the four positions P1 to P4 defining the first area A1 of FIG. 2) is transmitted from the portable terminal 400 to the printer 200.

Figure 7:
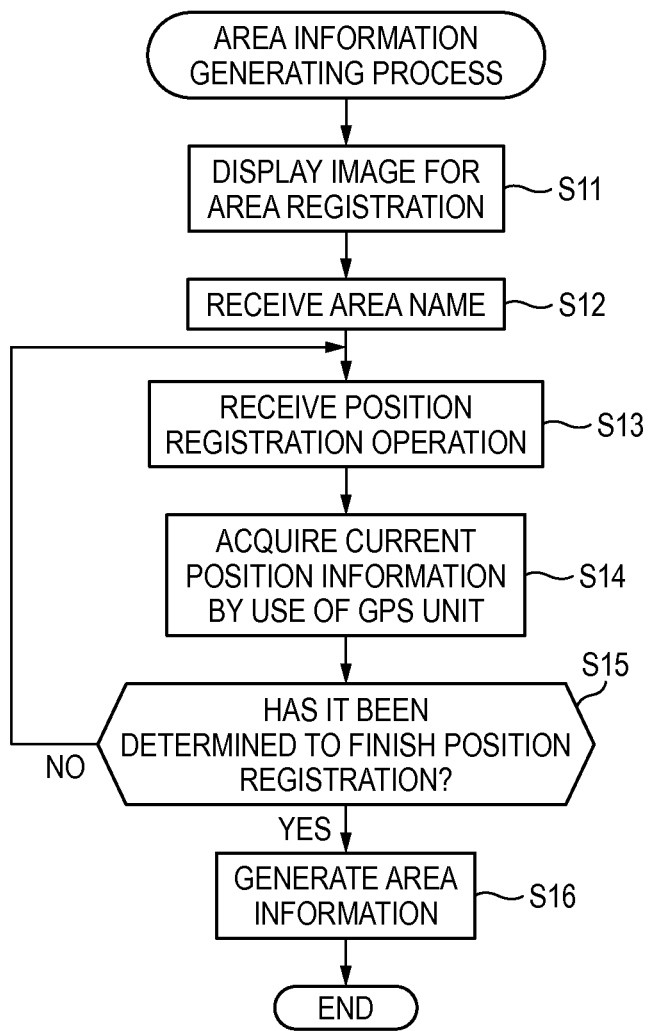
FIG. 7 is a flow chart of an area information generating process.

In STEP S1 of FIG. 6, the registering unit 310 performs an area information generating process. FIG. 7 is the flow chart of the area information generating process.

In STEP S11 of FIG. 7, the registering unit 310 displays a UI image EG for area registration on the display unit 470 of the portable terminal 400.

Figure 8:
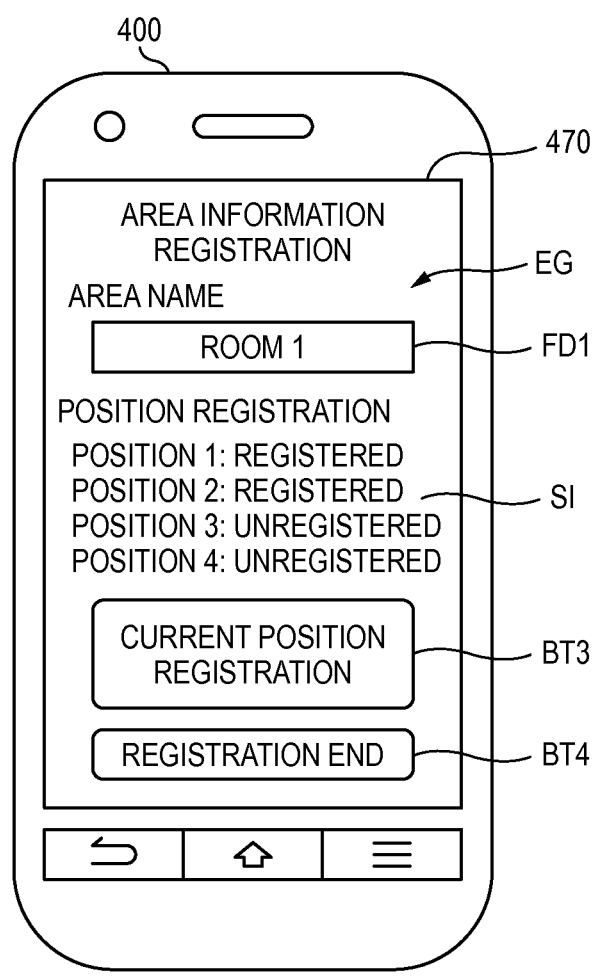
FIG. 8 is a diagram illustrating an example of an UI image EG for area registration.

FIG. 8 is a diagram illustrating an example of the UI image EG for area registration. A UI image EG for area registration shown in FIG. 8 includes a field FD1 for the user to input an area name, status information SI representing the registration statuses of positions, a registration button BT3, and an end button BT4.

In STEP S12, the registering unit 310 receives input of the name (area name) of an area which needs to be registered, from the user through the field FD1.

In STEP S13, the registration operation receiving unit 315 receives a registration operation of the user, that is, pushing of the registration button BT3. If the registration operation is not received ("NO" in STEP S13), the registration operation receiving unit 315 waits for the registration operation to be received. If the registration operation is received ("YES" in STEP S13), that is, if the user pushes the registration button BT3, in STEP S14, the registering unit 310 acquires the current position information representing the current position of the portable terminal 400 by use of the GPS unit 480. The acquired current position information is the coordinate information LD (FIG. 3A) including information representing a latitude, a longitude, and a height, respectively, as described above.

The user positions the portable terminal 400 at one position (for example, the position P1 of FIG. 2) of a plurality of apexes of an area (for example, the first area A1 of FIG. 2) desired to be registered, and pushes the registration button BT3. As a result, as can be seen from the above described STEPS S13 and S14, it is possible to make the portable terminal 400 easily acquire the position information (the coordinate information LD) representing the apex (for example, the position P1 of FIG. 2) of the area desired to be registered.

In STEP S15, the registering unit 310 determines whether to finish the position registration (acquisition of position information). Specifically, if the user pushes the end button BT4 (FIG. 8) ("YES" in STEP S15), the registering unit 310 determines to finish the position registration. However, when registration of three or more positions has not been performed, even if the user pushes the end button BT4 (FIG. 8), the registering unit 310 performs a processes such as a process of displaying a message for urging the user to register another position, without finishing the point registration. In this way, the registering unit 310 receives registration of three or more positions. This is because the area which is defined by the area information 222 of the present embodiment is defined based on three or more positions.

When it has been determined not to finish the position registration ("NO" in STEP S15), the registering unit 310 returns to STEP S13 and repeats the above described processes of STEPS S13 to S15. When it has been determined to finish the position registration ("YES" in STEP S15), the registering unit 310 proceeds to STEP S16. The user sequentially registers positions corresponding to the apexes of the area desired to be registered. After registering all apexes, the user pushes the end button BT4. For example, in a case of registering the first area A1 of FIG. 2, the user sequentially registers the four positions P1 to P4 corresponding to the four apexes of the quadrangular first area A1. That is, while carrying the portable terminal 400, the user sequentially moves to the four positions P1 to P4 and pushes the registration button BT3 at each position. Thereafter, the user pushes the end button BT4. Also, the user can register not only a quadrangular area based on four positions, but also, for example, a triangular area based on three positions, or a hexagonal area based on six positions. Generally speaking, the user can register areas of a variety of shapes based on the three or more positions.

In STEP S16, the generating unit 317 of the registering unit 310 generates the area information 222 (FIG. 3A) representing the area having the plurality of positions, having been registered by the user until that time, as apexes. That is, the generating unit 317 disposes a plurality of pieces of coordinate information LD, acquired in the above described STEP S14 until the time of transitioning to STEP S16, in the acquisition order, and adds the area name, acquired in STEP S12, to the plurality of pieces of coordinate information LD, thereby generating the area information 222. If the area information 222 is generated, the area information generating process finishes.

In STEP S2 (FIG. 6) subsequent to the area information generating process, the registering unit 310 transmits the generated area information 222 to a printer (also referred to as a target printer) which needs to be associated with the area information 222, among the plurality of printers 200A to 200D included in the system.

In STEP S3, the area information acquiring unit 120 of the target printer (a printer 200) receives the area information 222.

In STEP S4, the area information setting unit 130 of the target printer determines whether the target printer is located in the area. That is, the area information setting unit 130 determines whether the location of the target printer (that is, the position represented by the location information 223 (FIG. 1)) is included in the area defined by the area information 222, based on the area information 222 received in STEP S3 and the location information 223 stored in the target printer by the above described position information registering process (FIG. 4).

When the target printer is located in the area ("YES" in STEP S4), in STEP S5, the area information setting unit 130 stores (registers) the area information 222 received in STEP S3, in the non-volatile storage device 220 of the target printer. As a result, the area information 222 and the target printer are associated with each other. That is, in the present example, the area information 222 is stored in a printer which needs to be associated, thereby being associated with the printer.

When the target printer is not in the area ("NO" in STEP S4), the area information setting unit 130 skips STEP S5. That is, the area information 222 is not registered in the target printer.

In STEP S6, the response processing unit 150 of the communication control unit 100 transmits the result of the registration of the area information 222, that is, result information representing whether the area information 222 received in STEP S3 has been registered, to the portable terminal 400 which is the transmission source of the area information 222.

In STEP S7, the registering unit 310 of the portable terminal 400 receives the result information. In STEP S8, in order to notify the user of the registration result of the area information 222, the registering unit 310 displays the received result information on the display unit 470. That is, when the area information 222 has been registered in the target printer in STEP S5, on the display unit 470, information representing that the registration of the area information 222 in the target printer has succeeded is displayed. Meanwhile, when STEP S5 has been skipped and thus the area information 222 has not been registered in the target printer, on the display unit 470, information representing that the registration of the area information 222 in the target printer has failed is displayed.

According to the area information registering process described above, since it is possible to register an area based on three or more positions in a target printer, the user can set an appropriate area for the printing process or the specification information acquiring process to be described later.

Also, according to the area information registering process, while carrying the portable terminal 400, the user needs only to move to each position desired to be registered, and perform a predetermined registration operation, thereby capable of easily registering position information (coordinate information LD) representing positions (for example, the positions P1 to P4 of FIG. 2) for defining an area desired to be set. Thereafter, the generating unit 317 generates the area information 222 based on the registered positions. As a result, it is possible to easily generate the area information 222 representing an area defined based on three or more positions. Therefore, the user can easily register the area information 222 in the target printer by use of the portable terminal 400.

Further, when the target printer is located in the area defined by the received area information 222, the area information setting unit 130 of the target printer registers the corresponding area information 222. Meanwhile, when the target printer is not in the corresponding area, the area information setting unit 130 does not register the corresponding area information 222. As a result, the user can appropriately register the area information 222 defining an appropriate area including a target printer, as the area information 222 to be associated with the target printer.

Furthermore, it is possible to associate different areas with the plurality of printers, respectively. For example, in the example of FIG. 2, the area information 222 representing the first area A1 based on a position group including the four positions P1 to P4 is registered in association with the printer 200A, and the area information 222 representing the second area A2 based on a position group including the other four positions P5 to P8 is registered in association with the printer 200D. As a result, it is possible to flexibly set an appropriate area for the printing process or the specification information acquiring process.

In the present embodiment, in the non-volatile storage device 220 of the printer, the area information 222 is stored, whereby the printer and the area defined by the area information 222 are associated with each other. For example, when receiving the area information 222 from the printer, an external device (for example, the portable terminal 400 in the printing process to be described later) can recognize that the area defined by the received area information 222 and the printer which is the transmission source of the area information 222 are associated with each other. The printer which is the transmission source of the area information 222 can be identified, for example, by the IP address of the transmission source of the area information 222. When the area information 222 is stored in an apparatus, for example, a server, different from a printer which needs to be associated, it is preferable that the area information 222 should be stored in the server in association with printer identification information identifying the printer which needs to be associated. In this case, the area information 222 and the printer identification information are associated with each other, whereby an area defined by the area information 222 and the printer are associated with each other.

A-2-3. Area Information Setting Process

The area information setting process is a process in which a specific printer (for example, the printer 200B of FIG. 2) included in the system sets the area information 222, having been already registered in another printer (for example, the printer 200A of FIG. 2), as the area information 222 of the specific printer.

Figure 9:
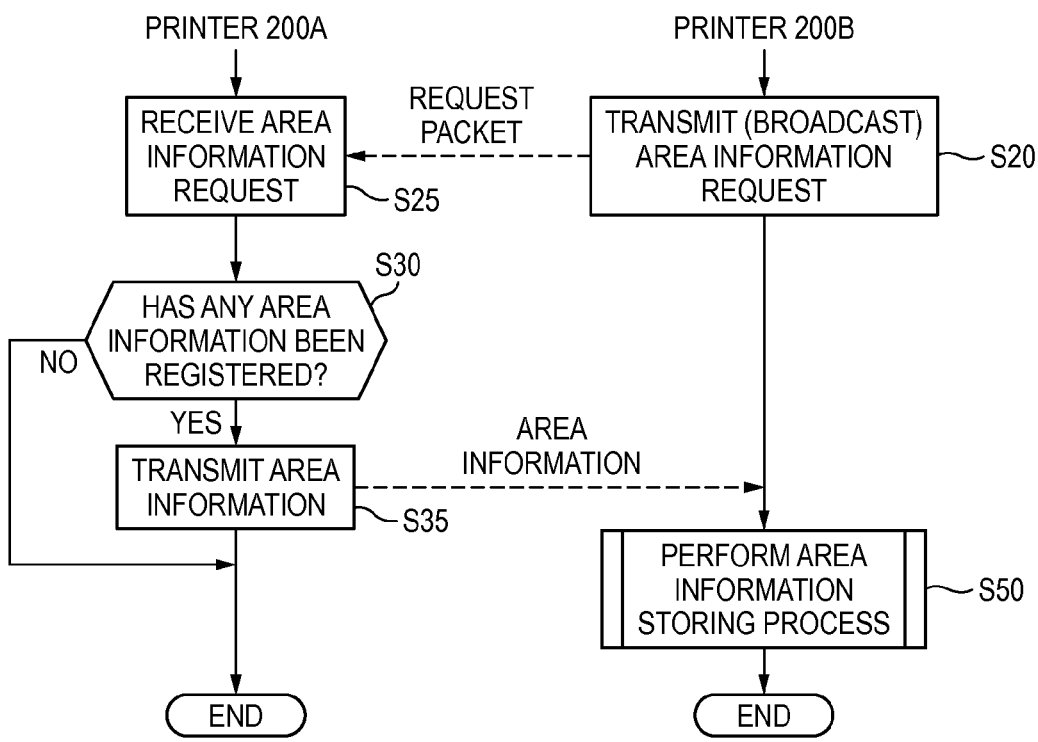
FIG. 9 is a flow chart of an area information setting process.

FIG. 9 is the flow chart of the area information setting process. The area information setting process is performed by the communication control unit 100 (FIG. 1) of the specific printer, and the communication control unit 100 (FIG. 1) of the other printer having the area information 222 registered therein. For example, when the specific printer is installed, after the above described position information registering process, the area information setting process is started in response to an instruction of a user.

A state where, in the above described area information registering process (FIG. 7), the area information 222 defining the first area A1 has been registered in the printer 200A and the area information 222 defining the second area A2 has been registered in the printer 200B as shown in FIG. 2, by use of the portable terminal 400, will be described as an example. This example will be described on the assumption that the area information 222 have not been registered in the printers 200B and 200C and the printer 200B is the above described specific printer.

In STEP S20, in order to search for another printer having the area information 222 registered therein, the area information acquiring unit 120 of the printer 200B which is the specific printer transmits an area information request for requesting transmission of the area information 222. Specifically, the area information acquiring unit 120 broadcasts a packet (also referred to as a request packet) serving as the area information request, onto the LAN 80. As a result, the request packet is transmitted to all of the other printers 200 (from which the printer 200B which is the transmission source is excluded, and which are the three printers 200A, 200C, and 200D in the example of FIG. 2) connected to the LAN 80 in a wired or wireless manner.

In STEP S25, the communication control unit 100 of each of the printers 200A, 200C, and 200D connected to the LAN 80 receives the request packet. FIG. 9 shows a flow chart only with respect to the printer 200A.

In STEP S30, the communication control unit 100 of the printer 200 (for example, the printer 200A) having received the request packet determines whether any area information 222 has been registered. That is, when there is the area information 222 stored in the non-volatile storage device 220, the communication control unit 100 determines that the area information 222 has been registered. Meanwhile, when there is no area information 222 stored in the non-volatile storage device 220, the communication control unit 100 determines that the area information 222 has not been registered.

When the area information 222 has been registered ("YES" in STEP S30), the response processing unit 150 of the printer 200 having received the request packet transmits the registered area information 222 to the printer 200B which is the transmission source of the request packet in STEP S35, and then finishes the process. When the area information 222 has not been registered ("NO" in STEP S30), the response processing unit 150 of the printer 200 having received the request packet does not transmit any area information 222 and finishes the process. In the example of FIG. 2, the area information 222 defining the first area A1 is transmitted from the printer 200A to the printer 200B, and the area information 222 defining the second area A2 is transmitted from the printer 200D to the printer 200B. Meanwhile, from the printer 200C, the area information 222 is not transmitted.

The area information acquiring unit 120 of the printer 200B waits for a reception period for receiving the area information 222 as response to the request packet to elapse, and then proceeds to STEP S50. The reception period is set to have an appropriate length such that it is possible to receive the area information 222 from the printers 200 (for example, the printer 200A) having received the request packet. Therefore, when the printers having received the request packet transmit the area information 222 in the above described STEP S35, the area information acquiring unit 120 receives the corresponding area information 222 in the reception period. In the example of FIG. 2, the area information acquiring unit 120 receives each of the area information 222 defining the first area A1 and the area information 222 defining the second area A2. Alternatively, when area information 222 is received from a predetermined number of printers, the area information acquiring unit 120 of the printer 200B may proceed to STEP S50 without waiting for the reception period to elapse.

In STEP S50, the area information setting unit 130 of the printer 200B performs an area information storing process. The area information storing process is a process in which, when the area information 222 is received during the reception period, among the received area information 222, the area information 222 satisfying a predetermined storing condition is stored (registered) as the area information 222 of the printer 200B in the non-volatile storage device 220.

Figure 10:
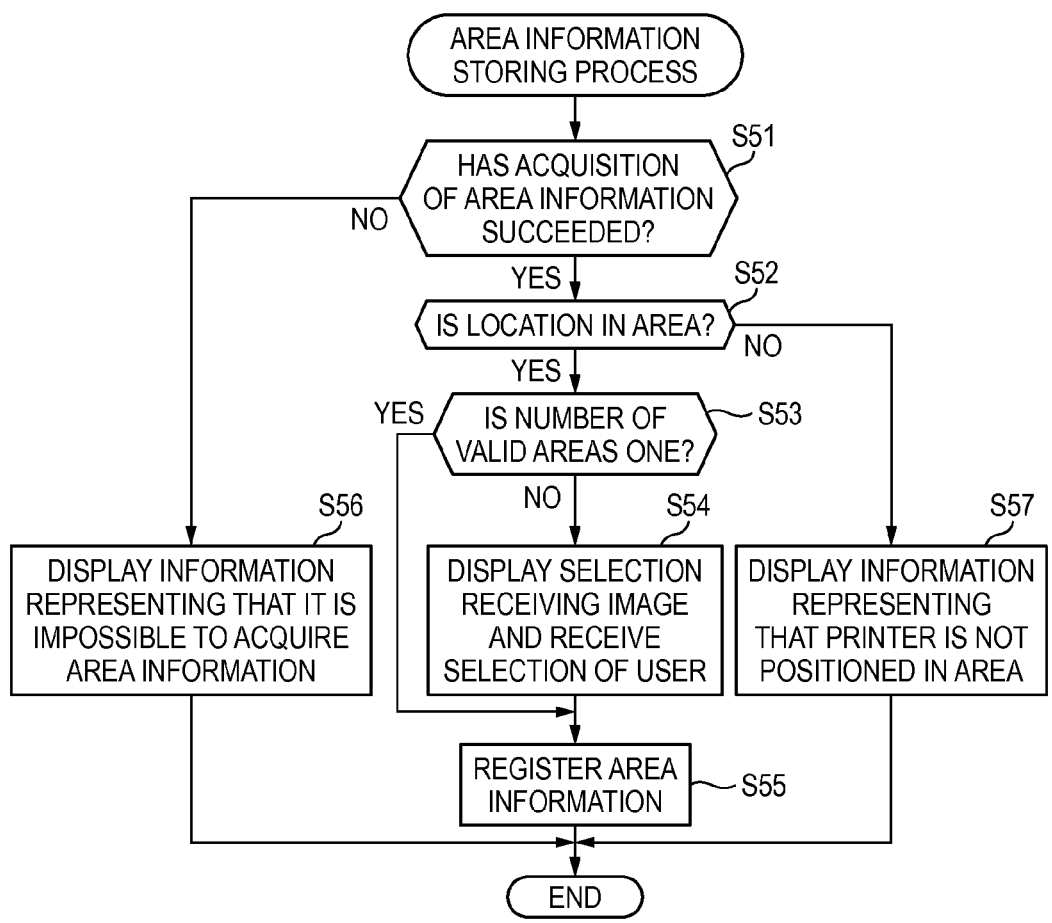
FIG. 10 is a flow chart of an area information storing process.

FIG. 10 is the flow chart of the area information storing process. In STEP S51, the area information setting unit 130 determines whether acquisition (reception) of any area information 222 from the other printers has succeeded in the above described reception period. Specifically, when it has been possible to receive one or more pieces of area information 222 from the other printers, the area information setting unit 130 determines that acquisition of the area information 222 has succeeded. Meanwhile, when it has not been possible to receive the area information 222, the area information setting unit 130 determines that acquisition of area information 222 has not succeeded. In the example of FIG. 2, two pieces of area information 222 are received. However, for example, when there is no area information 222 stored in any printers 200 included in the system, no area information 222 is received.

When acquisition of the area information 222 has not succeeded ("NO" in STEP S51), the area information setting unit 130 displays an error message representing that it is impossible to acquire the area information 222, on the display unit 270, in STEP S56, and finishes the process.

When acquisition of the area information 222 has succeeded ("YES" in STEP S51), in STEP S52, the area information setting unit 130 determines whether the location of the printer 200B is in an area defined by the acquired area information 222. The location of the printer 200 can be recognized by the above described location information 223 (FIG. 1). When a plurality of pieces of area information 222 has been acquired in the above described reception period, if the location of the printer 200B is in at least one of the areas defined by the plurality of pieces of area information 222, the area information setting unit 130 determines that the printer 200B is located in the area. For example, in the example of FIG. 2, since the printer 200B is not in the second area A2 but is in the first area A1, the area information setting unit 130 determines that the location of the printer 200B is in the area.

When the location of the printer 200B is not in the area ("NO" in STEP S52), the area information setting unit 130 displays an error message representing that the printer is not located in the area, on the display unit 270 in STEP S57, and finishes the process.

When the location of the printer 200B is in the area ("YES" in STEP S52), in STEP S53, the area information setting unit 130 determines whether the number of valid areas is one. Here, a valid area is an area including the location of the printer 200B. In the example of FIG. 2, since the printer 200B is not in the second area A2 but is in the first area A1, it is determined that the number of valid areas is one. Unlike the example of FIG. 2, in some cases such as a case where different pieces of area information 222 have been registered in the printer 200A and the printer 200C, respectively, and the printer 200B has been installed in an area defined by each of the area information 222, there may be a plurality of valid areas.

When the number of valid areas is one ("YES" in STEP S53), in STEP S55, the area information setting unit 130 stores (registers) the area information 222 defining the one valid area as the area information 222 corresponding to the printer 200B, in the non-volatile storage device 220. In the example of FIG. 2, in the printer 200B, the area information 222 defining the first area A1 is automatically registered.

When the number of valid areas is not one ("NO" in STEP S53), that is, when the number of valid areas is two or more, in STEP S54, the display control unit 140 displays a selection receiving image SG on the display unit 270 and receives a selection instruction of the user.

Figure 11:
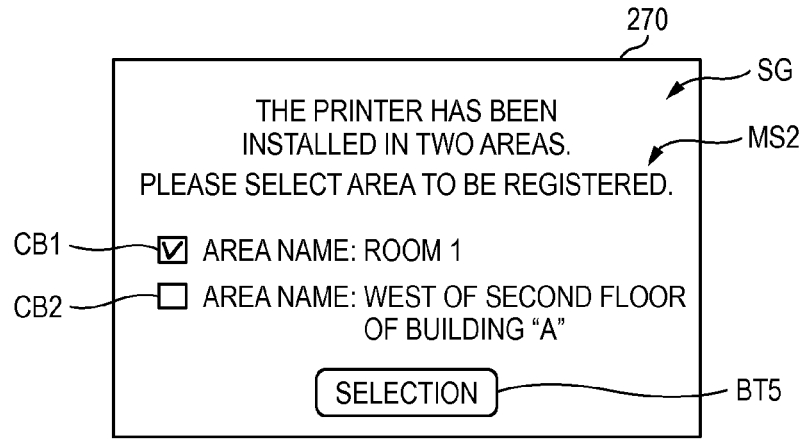
FIG. 11 is a diagram illustrating an example of a selection receiving image SG.

FIG. 11 is a diagram illustrating an example of the selection receiving image SG. A selection receiving image SG of FIG. 11 includes a message MA2 describing that the printer 200B has been installed in a plurality of areas and urging selection of an area, a plurality of check boxes CB1 and CB2 corresponding to the plurality of selectable areas, and a selection button BT5. In the vicinities of the plurality of check boxes CB1 and CB2, the area names of the corresponding areas are displayed, respectively. The user can input a check mark in a check box corresponding to an area to be selected, and then push the selection button BT5, thereby inputting a selection instruction. The user can select a plurality of areas, and can also select one area.

If a selection instruction of the user is received, in STEP S55, the area information setting unit 130 stores (registers) each of one or more area information 222 defining one or more selected areas, as the area information 222 corresponding to the printer 200B, in the non-volatile storage device 220.

According to the above described area information setting process (FIGS. 9 and 10), when the specific printer (for example, the printer 200B) is in an area defined by the area information 222 registered in the other printer (for example, the printer 200A), the specific printer can set the registered area information 222 as the area information 222 corresponding to the specific printer. As a result, it is possible to easily register the area information 222 in the specific printer. Therefore, it is possible to reduce the load of the user for registering the area information 222 in each printer.

Further, when the area information acquiring unit 120 of the specific printer acquires the plurality of pieces of area information 222 registered in other printers, and the specific printer is in the plurality of areas defined by the plurality of pieces of area information 222, respectively, the display control unit 370 displays information (for example, area names) related to the plurality of corresponding areas, on the display unit 270. As a result, it is possible to make the user recognize that the specific printer is located in the plurality of areas. Also, it is possible to make the user appropriately select the area which needs to be associated with the specific printer.

By the above described area information registering process (FIG. 7) and the area information setting process (FIG. 9), the area information 222 is registered in each of the printers 200A to 200D included in the system. For example, by the area information registering process, the area information 222 is registered in each of the printers 200A and 200D, respectively, as shown in FIG. 2, by use of the portable terminal 400. Further, by the area information setting process, the area information 222 is registered in each of the printers 200B and 200C, respectively. In a state where the area information 222 and the location information 223 have been registered in each of the printers 200A to 200D, as processes using the information, the specification information acquiring process and the printing process will be described hereinafter.

A-2-4. Specification Information Acquiring Process

The specification information acquiring process is a process of acquiring the specifications of the printers 200 included in the system, by use of the portable terminal 400. The specification of each printer 200 includes, for example, printing conditions which the printer 200 can execute, specifically, information on whether duplex printing is possible, information on whether color printing is possible, and information on whether printing on A3-siezed paper (A3 printing) is possible. The specification information acquiring process is performed, for example, when the user examines the specifications of the printers 200 included in the system. Alternatively, the specification information acquiring process may be performed on the occasion of displaying the specifications for each area in the printing process (to be described below) such that the user can select an area.

Figure 12:
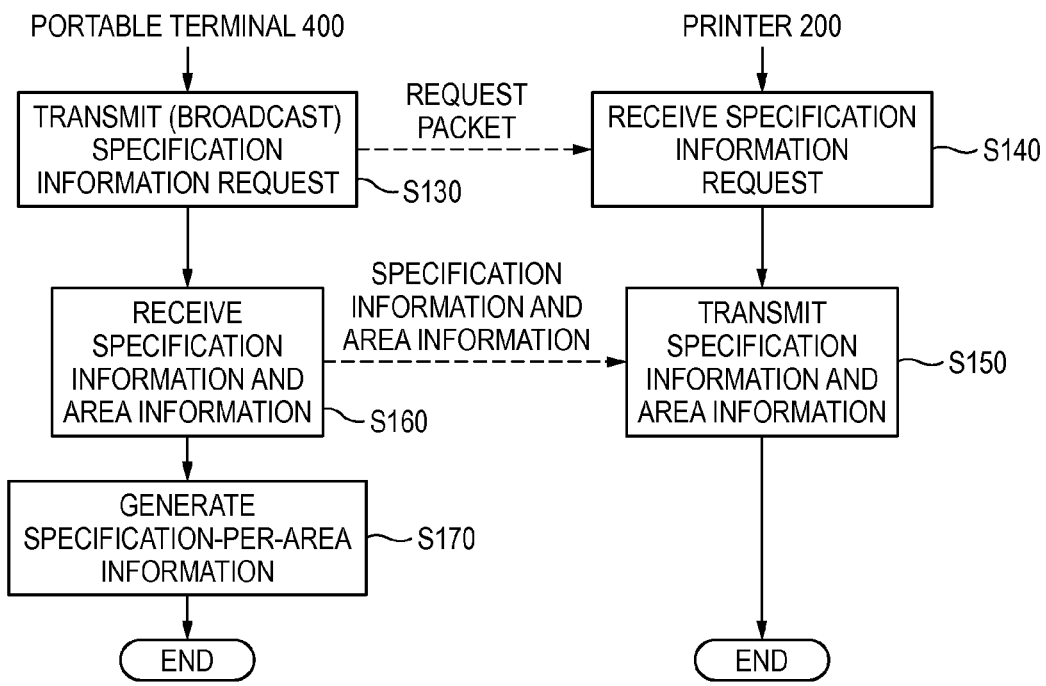
FIG. 12 is a flow chart of a specification information acquiring process.

FIG. 12 is the flow chart of the specification information acquiring process. In STEP S130, the condition information acquiring unit 340 of the portable terminal 400 transmits a specification information request for requesting specification information from the printers 200 included in the system. Specifically, the area information setting unit 130 broadcasts a packet (a request packet) serving as the specification information request, onto the LAN 80. As a result, the request packet is transmitted to all printers 200 (in the example of FIG. 2, the four printers 200A to 200D) connected to the LAN 80 in a wired or wireless manner.

In STEP S140, the communication control unit 100 of each of the printers 200A to 200D connected to the LAN 80 receives the specification information request (the request packet). FIG. 12 shows a flow chart only with respect to the printer 200A.

In STEP S150, the response processing unit 150 of each printer 200 (for example, the printer 200A) having received the request packet transmits the specification information SD and the area information 222, as a response to the request packet, to the portable terminal 400. The specification information SD is information (also referred to as condition information) representing printing conditions which the corresponding printer 200 can execute. In the example of FIG. 2, from each of the four printers 200A to 200D, the specification information SD and the area information 222 are transmitted.

FIGS. 13A to 13D are views illustrating examples of the specification information. In FIGS. 13A to 13D, the specification information SD (denoted by reference symbols SDa to SDd) which are transmitted from the four printers 200A to 200D are shown, respectively. As can be seen from FIGS. 13A to 13D, each specification information SD includes, for example, information on whether duplex printing is possible, information on whether color printing is possible, and information on whether printing on A3-siezed paper (A3 printing) is possible. From the specification information SD, for example, it can be seen that the printer 200C is a printer capable of executing color printing and monochrome printing, and it can be seen that the printers 200A, 200B, and 200D are monochrome printers.

In STEP S160, the condition information acquiring unit 340 receives the specification information SD and the area information 222. In the example of FIG. 2, the condition information acquiring unit 340 receives the area information 222 defining the first area A1, and three pieces of specification information SDa to SDc (FIGS. 13A to 13C) from three printers 200A to 200C. Further, the condition information acquiring unit 340 receives the area information 222 defining the second area A2 and the specification information SDd (FIG. 13D) from one printer 200D.

In STEP S170, the condition information acquiring unit 340 generates specification-per-area information ASD based on the specification information SD and the area information 222 received.

In FIG. 13E, an example of the specification-per-area information ASD is shown. The specification-per-area information ASD of FIG. 13E is information obtained by gathering printing conditions capable of being executed in printers included in each of areas defined by the area information 222 acquired in STEP S160, for the corresponding area. For example, if at least one printer of one or more printers included in a specific area can execute a specific printing condition, in the specification information of the specific area, it is determined that it is possible to execute the specific printing condition. In the example of FIG. 13E, in the specification information of the first area A1 (having "ROOM 1" as its area name), it is described that it is possible to execute duplex printing. The reason is that, among the three printers 200A to 200C included in the first area A1, the printers 200B and 200C cannot execute duplex printing, but the printer 200A can execute duplex printing. Similarly, since the printers 200A and 200B cannot execute color printing and A3 printing, but the printer 200C can execute color printing and A3 printing, in the specification information of the first area A1, it is described that it is possible to execute color printing and A3 printing. Further, since only one printer 200C exists in the second area A2

(having "ROOM 2" as its area name) (FIG. 2), the specification information of the second area A2 becomes the same as the specification information SDd of the printer 200D.

According to the specification information acquiring process described above, the portable terminal 400 can easily acquire the specification information SD from each printer. Further, the condition information acquiring unit 340 acquires the area information 222 in addition to the specification information SD, and generates the specification-per-area information ASD. As a result, for each area, it is possible to manage executable printing conditions. For example, when a plurality of printers has been disposed in one area, it may be a heavy burden for the user to grasp printing conditions capable of being executed in every printer. In the present example, for example, if the generated specification-per-area information ASD is displayed for the user, the user can recognize the printing conditions capable of being executed in each area. Therefore, it is convenient.

A-2-5. Printing Process

Figure 14:
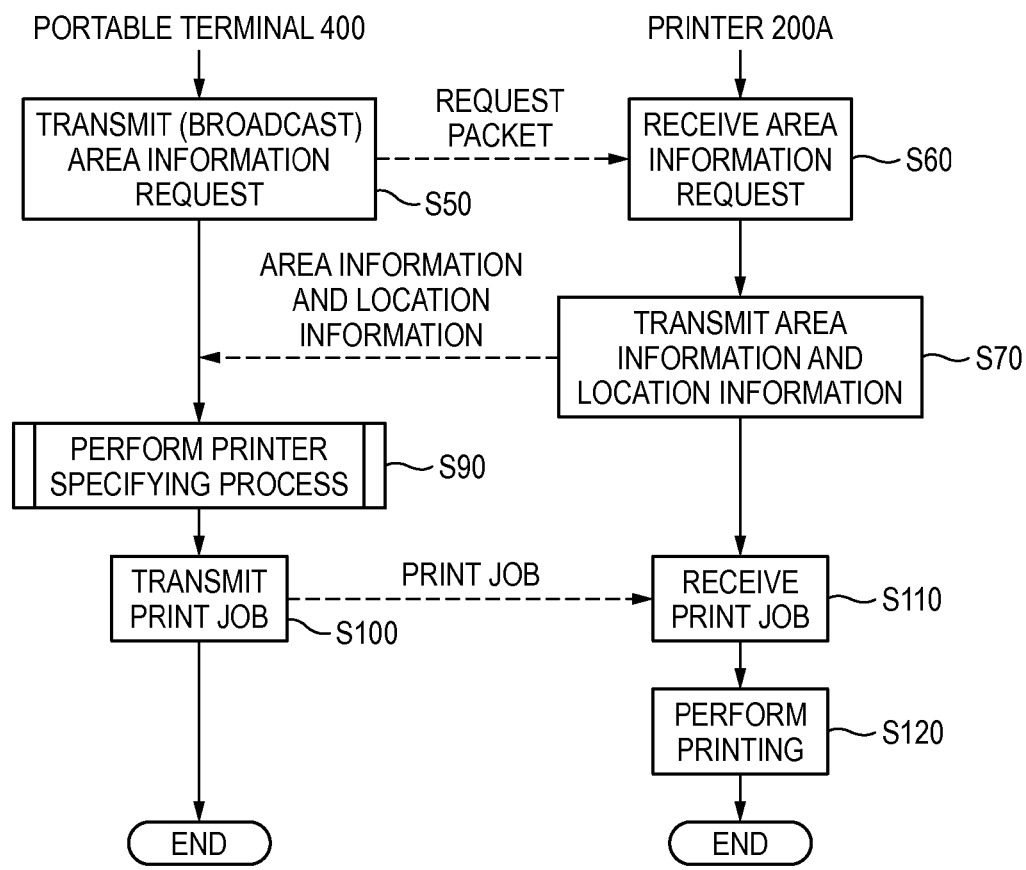
FIG. 14 is a flow chart of a printing process.

FIG. 14 is the flow chart of the printing process. The printing process is a process of making any one printer of the plurality of printers 200A to 200D (FIG. 2) to perform printing by use of the printer driver 300 of the portable terminal 400. The printing process is performed if the printer driver 300 of the portable terminal 400 receives a printing request from the user. The printing request includes designation of image data (for example, document data or drawing data) of a print target, and designation of printing conditions (for example, any one of a color mode and a monochrome mode, and a paper size).

In STEP S50 of FIG. 14, the area information acquiring unit 320 of the printer driver 300 transmits an area information transmission request for requesting each printer included in the system to transmit the area information 222. Specifically, the area information acquiring unit 320 broadcasts a request packet serving as the area information transmission request, onto the LAN 80 by wireless communication. As a result, the request packet is transmitted to all printers 200 (in the example of FIG. 2, the four printers 200A to 200D) included in the system.

In STEP S60, the communication control unit 100 of each of the four printers 200A to 200D connected to the LAN 80 receives a request packet. FIG. 14 shows a flow chart with respect to the printer 200A.

In STEP S70, the response processing unit 150 of each printer 200 having received the request packet transmits the area information 222 and the location information 223, as a response to the request packet, to the portable terminal 400. In the example of FIG. 2, from each of the four printers 200A to 200D, the area information 222 and the location information 223 are transmitted to the portable terminal 400.

The area information acquiring unit 320 of the portable terminal 400 waits a reception period for receiving the area information 222 and the location information 223 as responses to the request packet to elapse, and then proceeds to STEP S90. The reception period is set to have an appropriate length such that the area information acquiring unit 320 can receive the area information 222 and the location information 223 from the printers (for example, the printer 200A) having received the request packet. Therefore, when the printers having received the request packet transmits the area information 222 and the location information 223 in the above described STEP S70, the area information acquiring unit 320 receives the area information 222 and the location information 223 in the reception period. By receiving the information, the portable terminal 400 can recognize that there are printers 200 which should be candidates for the transmission destination of a print job, and can acquire IP addresses for accessing the printers 200. Alternatively, when the area information 222 is received from a predetermined number of printers, the area information acquiring unit 320 of the portable terminal 400 may proceed to STEP S90, without waiting for the reception period to elapse.

Figure 15:
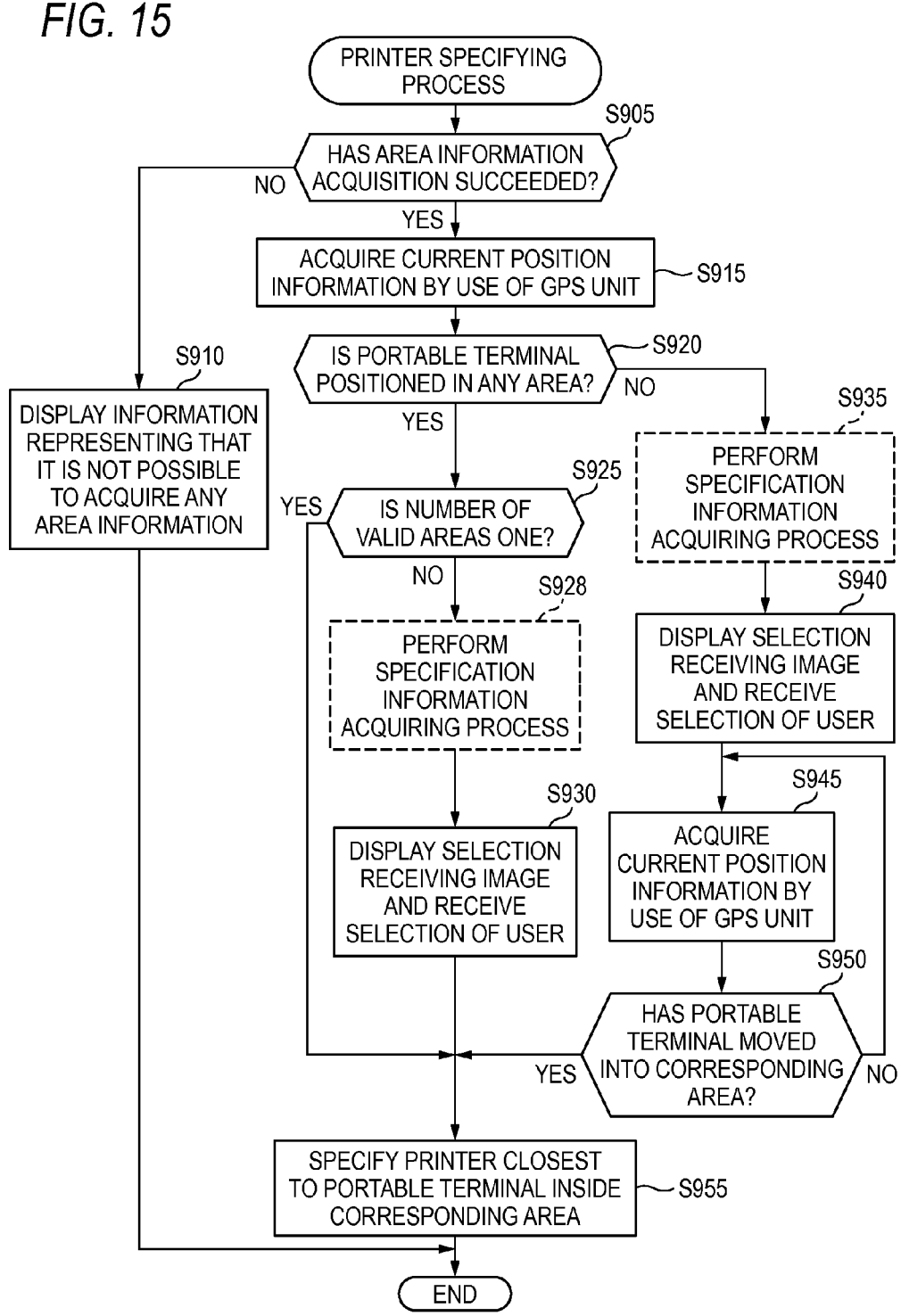
FIG. 15 is a flow chart of a printer specifying process.

In STEP S90, the printer driver 300 performs a printer specifying process (FIG. 15). The printer specifying process is a process of specifying a printer to be instructed to perform printing, from the plurality of printers included in the system, that is, the printers having transmitted the area information 222 and the location information 223 to the portable terminal 400 in STEP S70 of FIG. 14.

FIG. 15 is the flow chart of the printer specifying process. In STEP S905, the printer driver 300 determines whether acquisition (reception) of the area information 222 from the printers in the above described reception period has succeeded. Specifically, in a case where it has been possible to receive one or more pieces of area information 222, the printer driver 300 determines that acquisition of the area information 222 has succeeded. Meanwhile, in a case where it has not been possible to receive any area information 222, the printer driver 300 determines whether acquisition of area information 222 has not succeeded. In the example of FIG. 2, in general, four pieces of area information 222 will be received. However, in some cases such as a case where the power supplies of all printers 200 set on the LAN 80 are off, no area information 222 is received.

When acquisition of the area information 222 has not succeeded ("NO" in STEP S905), the printer driver 300 displays an error message representing that it is not possible to acquire any area information 222, on the display unit 470 in STEP S910, and finishes the process.

When acquisition of the area information 222 has succeeded ("YES" in STEP S905), in STEP S915, the terminal position acquiring unit 330 acquires current position information representing the current position of the portable terminal 400, by use of the GPS unit 480. The acquired current position information is the coordinate information LD (FIG. 3A) including information representing a latitude, a longitude, and a height, respectively.

In STEP S920, based on the area information 222 and the current position information of the portable terminal 400, the determining unit 355 determines whether the portable terminal 400 is positioned in the area defined by the corresponding area information 222. When a plurality of pieces of area information 222 has been acquired in the above described reception period, if the current position of the portable terminal 400 is in at least one area defined by the plurality of pieces of area information 222, the determining unit 355 determines that the portable terminal 400 is positioned in the area.

Figure 16:
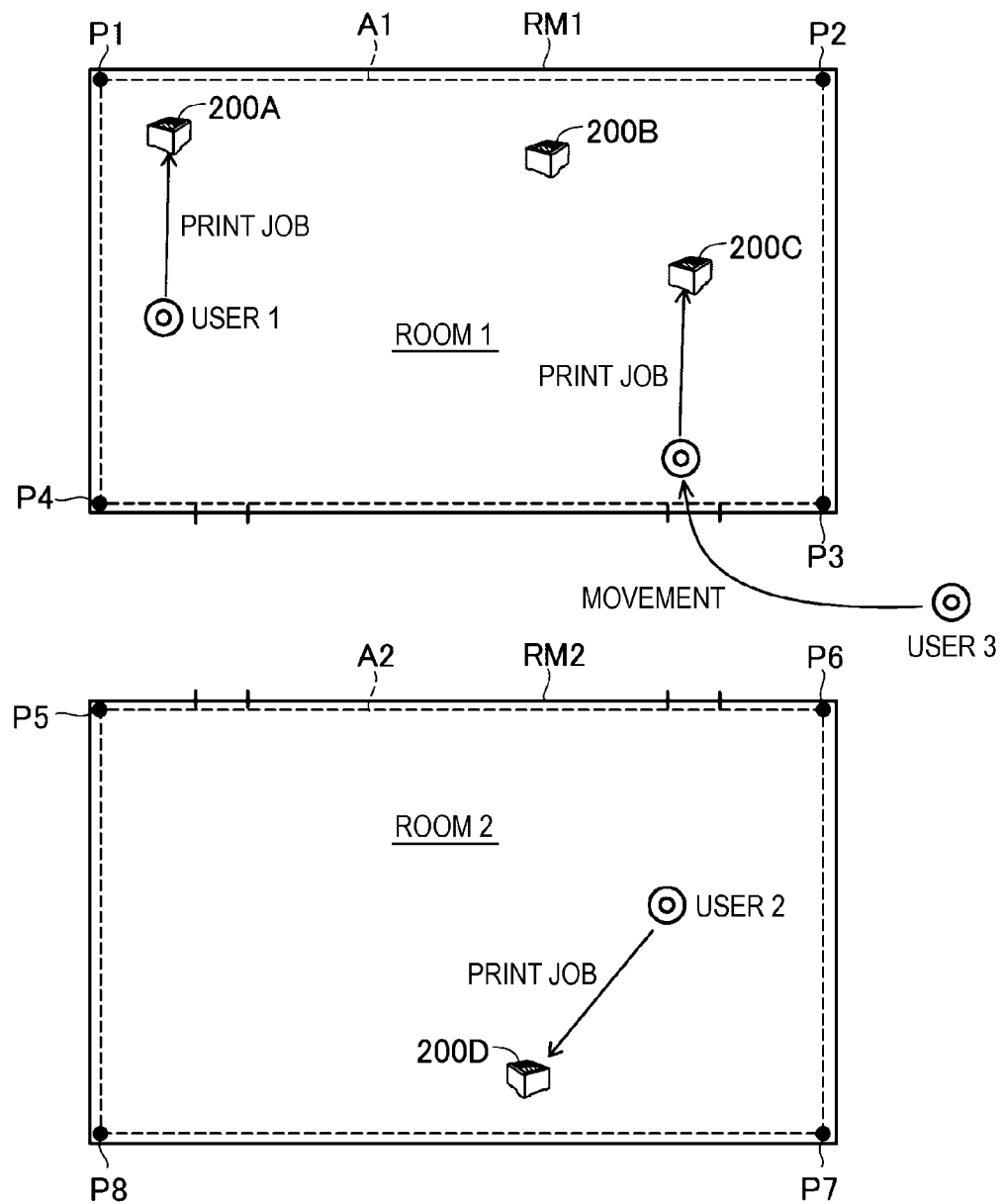
FIG. 16 is an explanatory view of the printing process.

FIG. 16 is the explanatory view of the printing process. For example, when the owner of the portable terminal 400 is User 1 of FIG. 16, the determining unit 355 determines that the portable terminal 400 is positioned in the first area A1. Also, when the owner of the portable terminal 400 is User 2 of FIG. 16, the determining unit 355 determines that the portable terminal 400 is positioned in the second area A2. Also, when the owner of the portable terminal 400 is User 3 of FIG. 16, the determining unit 355 determines that the portable terminal 400 is not positioned in any area.

When the portable terminal 400 is not in any area ("NO" in STEP S920), in STEP S940, the display control unit 370 displays a selection receiving image SG2 on the display unit 470, and receives a selection instruction of the user.

Figure 17:
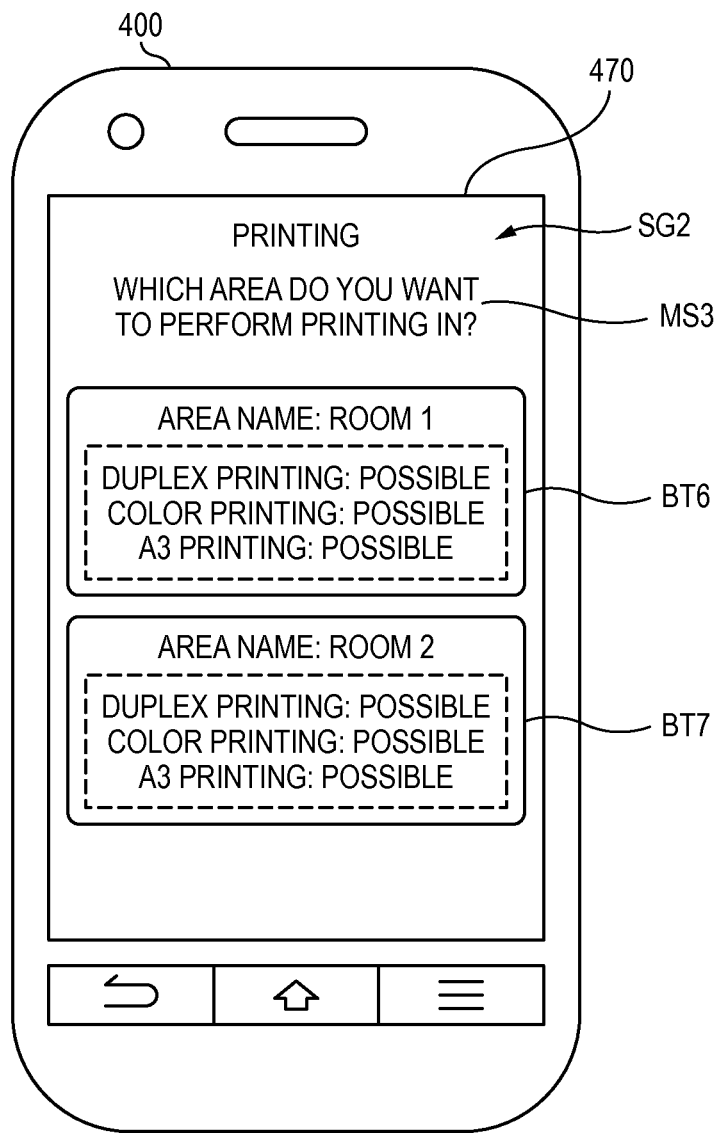
FIG. 17 is a diagram illustrating an example of a selection receiving image SG2.

FIG. 17 is a diagram illustrating an example of the selection receiving image SG2. A selection receiving image SG2 of FIG. 17 includes a message MA3 urging selection of an area to perform printing from a plurality of areas, and selection buttons BT6 and BT7 corresponding to the plurality of selectable areas, respectively. In the present example, the plurality of selectable areas is every area defined by one or more pieces of area information 222 acquired by the area information acquiring unit 320. The selection receiving image SG2 of FIG. 17 is an image which is displayed when the owner of the portable terminal 400 is User 3 of FIG. 16. That is, since the position of User 3 of FIG. 16 is not positioned in the first area A1 and is also not positioned in the second area A2, in the above described STEP S920, it is determined that the portable terminal 400 is not positioned in any area, and in STEP S940, the selection receiving image SG2 in which the first area A1 ("ROOM 1") and the second area A2 are selectable ("ROOM 2") is displayed.

As shown in FIG. 17, the display control unit 370 displays area names, as information related to areas (area-related information), inside the selection buttons BT6 and BT7, respectively. As a result, the user can recognize the positions of printers capable of printing, by their area names, and select an appropriate printer. As a result, it is possible to easily select an appropriate printer. For example, when the plurality of printers 200 has been installed in the system, it is comparatively different to select an appropriate printer 200 from them. In the present example, only by selecting an area, an appropriate printer 200 can be selected.

Also, based on the specification-per-area information ASD (FIG. 13E), the condition information acquiring unit 340 may display information representing executable printing conditions for the individual areas, as area-related information, inside the buttons BT6 and BT7, as shown by broken lines in FIG. 17. In this case, the user can select an appropriate area based on the information representing the executable printing conditions. As a result, even when the portable terminal 400 is not in the first area A1 or the second area A2, based on the information representing the executable printing conditions, it is possible to make an appropriate printer to perform printing.

Here, in order to display the information representing the printing conditions for the individual areas inside the buttons BT6 and BT7, respectively, prior to STEP S940, as shown by a broken line in FIG. 15, in STEP S935, the condition information acquiring unit 340 performs the above described specification information acquiring process. In this case, in the subsequent STEP S940, the display control unit 370 can display the information representing the printing conditions for the individual areas, inside the buttons BT6 and BT7, respectively.

If selection of one area is received through the selection receiving image SG2 in STEP S940, in STEP S945, the terminal position acquiring unit 330 acquires the current position information of the portable terminal 400 by use of the GPS unit 480.

In the subsequent STEP S950, based on the current position information and the area information 222 defining the area selected in STEP S940, the printer specifying unit 350 determines whether the portable terminal 400 has moved into the selected area. When the portable terminal 400 has not moved into the selected area ("NO" in STEP S950), the portable terminal 400 returns to STEP S945, and repeats STEPS S940 and S950. Meanwhile, when the portable terminal 400 has moved into the selected area ("YES" in STEP S950), in STEP S955, the printer specifying unit 350 specifies a printer closest to the portable terminal 400, among one or more printers 200 included in the selected area, as a printer to be instructed to perform printing. That is, when the portable terminal 400 is not in any area, the terminal position acquiring unit 330 periodically acquires the current position information, and the printer specifying unit 350 determines whether the portable terminal 400 has moved into the area selected by the user, based on the current position information. Further, specifying of a printer to be instructed to perform printing is suspended until the portable terminal 400 moves into the selected area. The user arrives in the area selected by the user, based on information (for example, the area name "ROOM 1") related to the area displayed in the selection receiving image SG2 of FIG. 17. Thereafter, at the time when the portable terminal 400 arrives in the selected area, a printer, closet to the portable terminal 400, among one or more printers 200 included in the area is specified as a printer to be instructed to perform printing. Specifically, based on the current position information of the portable terminal 400 at the time when the portable terminal 400 arrives in the selected area, and the location information 223 of each of the one or more printers included in the area, the printer specifying unit 350 calculates an inter-apparatus distance D between the portable terminal 400 and each of the one or more printers included in the system. More specifically, based on three-dimensional coordinate values (a latitude value, a longitude value, and an altitude value) included in the current position information of the portable terminal 400, and three-dimensional coordinate values (a latitude value, a longitude value, and an altitude value) included in each location information 223, a horizontal distance, that is, a distance based on the latitude values and the longitude values is calculated, for example, by use of a known formula, specifically, Hubeny formula or Lambert-Andoyer formula. When a vertical distance is considered, the vertical distance is calculated based on a difference value between the altitude values. Thereafter, based on the horizontal distance and the vertical distance, the inter-apparatus distance D is calculated. The printer specifying unit 350 specifies a printer corresponding to the minimum value of the calculated one or more inter-apparatus distances D, as the printer to be instructed to perform printing.

When it is determined in STEP S920 that the portable terminal 400 is not positioned in any area ("YES" in STEP S920), in STEP S925, the printer specifying unit 350 determines whether the number of valid areas is one. Here, a valid area is an area including the current position of the portable terminal 400. For example, when the owner of the portable terminal 400 is User 1 or User 2 of FIG. 16, the determining unit 355 determines that the number of valid areas is one. The example of FIG. 16 does not correspond to a case where it is determined that the number of valid areas is two or more. An example in which it is determined that the number of valid areas is two or more will be described in the second embodiment.

When the number of valid areas is one ("YES" in STEP S925), in STEP S955, the printer specifying unit 350 specifies a printer closest to the portable terminal 400, among one or more printers included in the one valid area, as a printer to be instructed to perform printing. For example, when the owner of the portable terminal 400 is User 1 of FIG. 16, the printer 200A closest to User 1 among the three printers 200A to 200C included in the first area A1 is specified. When the owner of the portable terminal 400 is User 2 of FIG. 16, since there is only one printer 200D inside the second area A2, the printer 200D is specified.

When the number of valid areas is two or more ("NO" in STEP S925), in STEP S930, the display control unit 370 displays the above described selection receiving image SG2 (FIG. 17) on the display unit 470, and receives a selection instruction of the user.

As described above, the selection receiving image SG2 can includes area names and information representing executable printing conditions for individual areas, as information related to the areas (area-related information). In order to display information representing printing conditions for individual areas, as the area-related information, prior to STEP S930, as shown by a broken line in FIG. 15, in STEP S928, the condition information acquiring unit 340 performs the above described specification information acquiring process. In this case, in the subsequent STEP S930, the display control unit 370 can display information representing printing conditions for the individual areas, inside the selection receiving image SG2.

In the subsequent STEP S955, the printer specifying unit 350 specifies a printer closest to the portable terminal 400, among one or more printers 200 included in the selected area, as the printer to be instructed to perform printing.

If the printer to be instructed to perform printing is specified, in STEP S100 of FIG. 14, the print instructing unit 360 transmits a print job to the specified printer. The print job includes print image data representing a print image, and condition information designating print conditions. The print job is an example of a print instruction for instructing the printer 200, which is the transmission destination, to perform printing based on the print image data. In STEP S110, the job receiving unit 110 of the specified printer receives the print job. In STEP S120, the printing control unit 30 of the printer 200 having received the print job performs printing based on the print job. If the printing is performed, the printing process finishes.

According to the printing process described above, based on the area information 222 acquired from the individual printers 200 included in the system and the current position information of the portable terminal 400, the printer specifying unit 350 specifies the candidate for a printer 200 to be used. As a result, the candidate for the printer to be used can be appropriately specified.

More specifically, when the portable terminal 400 is positioned in an area defined by the area information 222 acquired from each printer by the area information acquiring unit 320, the print instructing unit 360 issues a print instruction to a printer located in the corresponding area. As a result, the user can make an appropriate printer to perform printing. For example, when the owner of the portable terminal 400 is User 1 of FIG. 1, a print instruction is automatically issued (a print job is transmitted) to the printer 200A closest to User 1, among the three printers 200A to 200C included in the first area A1. Therefore, since the user can easily perform collection of a printed document, it is convenient. Also, since the user can quickly collect the printed document, it is possible to improve security. That is, it is possible to reduce the possibility of the printed document being stolen, and the possibility of the printed document being viewed by someone unrelated. Here, when the portable terminal 400 is positioned in one area, the print instructing unit 360 may issue a print instruction from the receiver side having received a transmission instruction from the user, without automatically issuing a print instruction.

Further in the above described printing process, when the portable terminal 400 is not positioned in the area defined by the area information 222, an print instruction is not immediately issued to a printer, but the information related to areas (for example, the area names or the condition information of the individual areas (FIG. 17)) are displayed on the display unit 470. As a result, since a print instruction is not issued from a position too far from a printer, security is improved. Further, the user can appropriately determine a printer to be instructed to perform printing, with reference to the information related to the areas.

Like this, in the above described printing process, with respect to the selection of a printer, different processes are performed depending on whether the portable terminal 400 is positioned in an area or not. Therefore, it is possible to select an appropriate printer to perform printing.

Further, when the portable terminal 400 is not positioned in the area defined by the area information 222 (for example, when the portable terminal 400 is at the position of User 3 of FIG. 16), the print instructing unit 360 does not immediately issue a print instruction to a printer included in the corresponding area and suspends the print instruction. Thereafter, at the time when the user arrives in the selected area, the print instructing unit 360 issues the print instruction to a printer included in the area (see FIG. 16). As a result, it is possible to issue a print instruction at a timing appropriate from the viewpoint of security or the like.

B. Second Embodiment

In the second embodiment, another example of setting of areas which are defined by the area information 222 will be described. In the first embodiment, the two areas which are set, that is, the first area A1 and the second area A2 do not overlap each other. However, in the second embodiment, an example in which a plurality of areas is set to overlap each other will be explained. Also, in the first embodiment, one area is associated with one printer 200 included in the system. However, in the second embodiment, a plurality of areas is associated with one printer 200.

Figure 18:
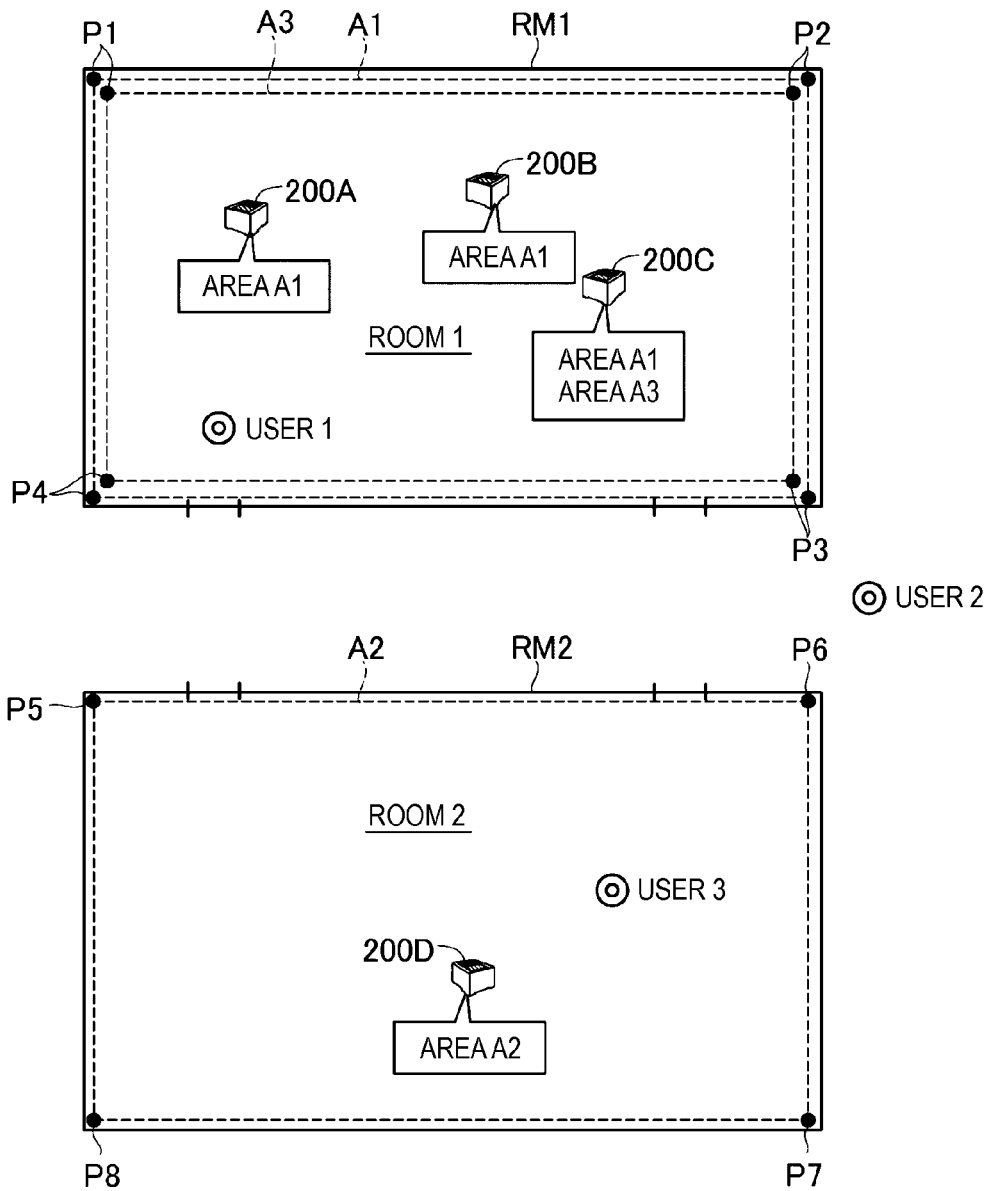
FIG. 18 is a view for explaining setting of area according to a second embodiment.

FIG. 18 is a view for explaining setting of areas according to the second embodiment. In the second embodiment, a plurality of areas corresponding to printing conditions (for example, color printing or monochrome printing) which the printers can execute is set. Specifically, a first area A1 and a second area A2 of the second embodiment are areas for being associated with each printer capable of executing monochrome printing. The area name of the first area A1 is, for example, "ROOM 1: MONOCHROME", and the area name of the second area A2 is, for example, "ROOM 2: MONOCHROME". A third area A3 of the second embodiment is an area for being associated with each printer capable of executing color printing. The area name of the third area A3 is, for example, "ROOM 1: COLOR". The sizes and positions of the first area A1 and the second area A2 of the second embodiment are the same as the sizes and positions of the first area A1 and the second area A2 of the first embodiment. The size and position of the third area A3 of the second embodiment is the same as the size and position of the first area A1. That is, in the second embodiment, the first area A1 and the third area A3 overlap with each other.

Three printers 200A, 200B, and 200D of the second embodiment are monochrome printers which can execute monochrome printing but cannot execute color printing. A printer 200C of the second embodiment is a color/monochrome printer which can execute monochrome printing and can also execute color printing.

In the second embodiment, with respect to the printer 200A and the printer 200B which are monochrome printers, the first area A1 is associated but the third area A3 is not associated. That is, in the printer 200A and the printer 200B, only area information 222 defining the first area A1 is stored. Also, with respect to the printer 200C which is a color/monochrome printer, both of the first area A1 and the third area A3 are associated. That is, in the printer 200C, the area information 222 defining the first area A1, and area information 222 defining the third area A3 are stored. Further, with respect to the printer 200D which is a monochrome printer, the second area A2 is associated. That is, in the printer 200D, only area information 222 defining the second area A2 is stored.

In this state, if the same printing process (FIGS. 14 and 15) as that of the first embodiment is performed, in STEP S70 of FIG. 14, the printers 200A, 200B, and 200D each having a piece of area information 222 stored therein each transmit the piece of area information 222 and the location information 223 to the portable terminal 400. Also, the printer 200C having two pieces of area information 222 stored therein transmits the two pieces of area information 222 and the location information 223 to the portable terminal 400. As a result, the area information acquiring unit 320 of the portable terminal 400 receives three pieces of area information 222 representing the three areas A1 to A3.

Thereafter, for example, when the owner of the portable terminal 400 is User 1 of FIG. 18, since the portable terminal 400 is in the first area A1 and is also in the third area A3, in the printer specifying process of FIG. 15, in STEP S920, it is determined that the portable terminal 400 is positioned in an area ("YES" in STEP S920). Then, since the number of valid areas is two, in STEP S925, it is determined that the number of valid areas is two or more ("NO" in STEP S925). Thereafter, in STEP S930, the display control unit 370 displays a selection receiving image SG3 on the display unit 470, and receives a selection instruction for selecting one area from the two valid areas, from the user.

Figure 19A:
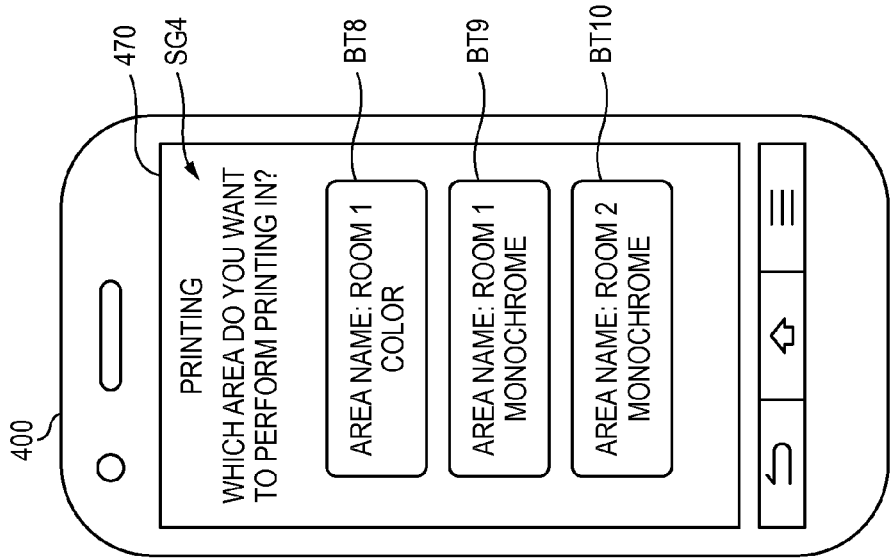
FIGS. 19A and 19B are views illustrating examples of a selection receiving image of the second embodiment.
Figure 19B:
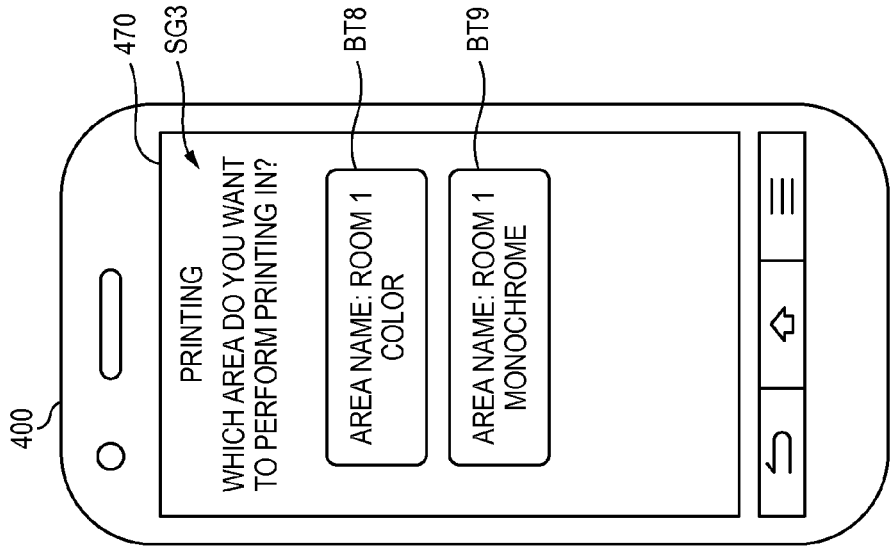

FIGS. 19A and 19B are views illustrating examples of the selection receiving image of the second embodiment. A selection receiving image SG3 of FIG. 19A includes two selection buttons BT8 and BT9 corresponding to two valid areas. As described with respect to the first embodiment, as information related to the areas (area-related information), area names are displayed inside the selection buttons BT8 and BT9. Since the area names of the second embodiment use not only words for making the user recognize the positions of the areas such as "ROOM 1", but also words representing printing conditions such as "COLOR" and "MONOCHROME", the user can select an appropriate area for being instructed to perform desired printing.

If selection of an area is received, in STEP S955, from one or more printers 200 included in the selected area and associated with the selected area, a printer 200 closest to the portable terminal 400 is specified.

Thereafter, as shown in FIG. 15, a print job is transmitted to the specified printer 200 in STEP S100, and the print job is received by the specified printer 200 in STEP S110, and printing is performed by the specified printer 200.

As a result, when the owner of the portable terminal 400 is User 1 of FIG. 18 (a user inside the first room RM1), if the first area A1 is selected, printing is performed by a printer closest to the user, among the three printers 200A to 200C capable of executing monochrome printing. Meanwhile, in the case where the owner of the portable terminal 400 is User 1 of FIG. 18, if the third area A3 is selected, printing is performed by the printer 200C capable of executing color printing. Like this, when the portable terminal 400 is positioned in a plurality of areas, since a print instruction is issued to a printer included in an area selected from the plurality of areas by the user, it is possible to issue a print instruction to an appropriate printer according to the intention of the user.

Also, when the owner of the portable terminal 400 is User 2 of FIG. 18, since the portable terminal 400 is not positioned in any area of the three areas A1 to A3, in STEP S920, it is determined that the portable terminal 400 is not in any area ("NO" in STEP S920). Thereafter, in STEP S940, the display control unit 370 displays a selection receiving image SG4 on the display unit 470, and receives a selection instruction for selecting one area from the three areas A1 to A3 defined by the three pieces of area information 222 acquired by the area information acquiring unit 320, from the user.

As shown in FIG. 19B, a selection receiving image SG4 includes three selection buttons BT8, BT9, and BT10 corresponding to three selectable areas. Inside the three selection buttons BT8, BT9, and BT10, corresponding area names are displayed, respectively. As a result, the user can select an appropriate area for being instructed to perform desired printing.

If selection of an area is received, in STEP S955, from one or more printers 200 included in the selected area and associated with the selected area, a printer 200 closest to the portable terminal 400 is specified.

Thereafter, as shown in FIG. 15, a print job is transmitted to the specified printer 200 in STEP S100, and the print job is received by the specified printer 200 in STEP S110, and printing is performed by the specified printer 200.

That is, when the owner of the portable terminal 400 is User 2 of FIG. 18 (a user existing outside of the first and second rooms RM1 and RM2), if the first area A1 is selected, the user moves into the first room RM1, and then printing is performed by the printer closest to the user, among the three printers 200A to 200C capable of executing monochrome printing. Also, in the case where the owner of the portable terminal 400 is User 2 of FIG. 18, if the third area A3 is selected, the user moves into the first room RM1, and then printing is performed by the printer 200C capable of executing color printing. In the case where the owner of the portable terminal 400 is User 2 of FIG. 18, if the second area A2 is selected, the user moves into the second room RM2, and then printing is performed by the printer 200D included in the second room RM2.

When the owner of the portable terminal 400 is User 3 of FIG. 18, since the portable terminal 400 is in the second area A2, in STEP S920, it is determined that the portable terminal 400 is positioned in an area ("YES" in STEP S920). Then, since the number of valid areas is one, in STEP S925, it is determined that the number of valid areas is one ("YES" in STEP S925), and in the subsequent STEP S955, the printer 200D included in the second area A2 is specified. As a result, printing is automatically performed by the printer 200D.

As can be seen from the above description, the first area A1 and the third area A3 can be set to overlap each other. Further, according to a rule in which the first area A1 should be associated with each printer capable of executing monochrome printing and the third area A3 should be associated with each printer capable of executing color printing, the area information 222 is stored in the printers, respectively. Furthermore, it is allowed that two pieces of area information 222 are stored in the printer 200C capable of executing both of color printing and monochrome printing. Accordingly, it is possible to flexibly set an area to be associated with one printer 200.

Further, the area information acquiring unit 120 acquires the plurality of pieces of area information 222 corresponding to the one printer 200, and when the portable terminal 400 is in at least one area of a plurality of areas defined by the plurality of area information 222, the print instructing unit 360 can issue a print instruction to one printer corresponding to the plurality of areas. That is, in the second embodiment, the first area A1 and the third area A3 are set to overlap each other. As a result, for example, as described above, the user can select an appropriate area and issue a print instruction to the appropriate printer, according to a desired printing condition (specifically, color printing or monochrome printing). Also, in the second embodiment, since the area names include information related to printing conditions, the user can select an appropriate area according to a desired printing condition (specifically, color printing or monochrome printing), even without performing the specification information acquiring process (STEP S920 or S935 of FIG. 15) of the first embodiment.

C. Modifications (1) In the printing process of the above described first embodiment, the specification information acquiring process is performed, whereby the specification-per-area information ASD is acquired (STEP S935 or S928), and the selection receiving image SG2 (FIG. 17) representing the specifications (executable printing conditions) of the individual areas is displayed (STEP S940 or S930). As a result, the user can select an area based on the specifications of the individual areas, and thus, based on the specifications of the individual areas, candidates for an appropriate printer 200 to be instructed to perform printing can be specified. Alternatively, the printer specifying unit 350 may automatically select an appropriate area, based on the specifications of the individual areas, without receiving the selection by the user. For example, when the printing process is performed, the printer specifying unit 350 may automatically select an area capable of executing printing conditions included in a printing request received from the user. In this case, similarly in the first embodiment, based on the specifications of the individual areas, candidates for an appropriate printer 200 to be instructed to perform printing are specified.

(2) In the printing process of the above described first embodiment, in the selection receiving image SG2 which is displayed in STEP S940 or S950, information related to areas, such as area names or the specifications of the individual areas, are displayed (FIG. 17). Alternatively, information related to at least some printers of the plurality of printers included in the area, such as the printer name and specification of each printer included in the area, may be displayed in the selection receiving image SG2. Generally speaking, information related to areas, and printer-related information, such as information related to individual printers, appropriate for selecting a printer to be instructed to perform printing may be displayed. However, if information related to the area is displayed, in some cases, for example, when there is a plurality of printers located in the area, it is possible to reduce the possibility of an excessive amount of information being displayed to be a burden on the user.

(3) In the above described first embodiment, in STEP S955, the printer specifying unit 350 specifies one printer closest to the portable terminal 400, among a plurality of printers included in one area. Alternatively, the printer specifying unit 350 may specify one printer in view of the specifications of the plurality of printers included in the one area, specifically, executable printing conditions or print speeds. For example, when the printing process is performed, the printer specifying unit 350 may specify one printer closest to the portable terminal 400, among a plurality of printers capable of executing printing conditions included in a printing request received from the user. Alternatively, the printer specifying unit 350 may preferentially specify a printer with the highest performance in the area, for example, a printer having a high print speed, and when there is a plurality of printers having the same print speed, the printer specifying unit 350 may specify one printer closest to the portable terminal 400, among the plurality of corresponding printers. In this case, the printer specifying unit 350 may acquire necessary related information such as print speeds from the individual printers, for example, by inquiring of the individual printers, similarly in the specification information acquiring process (FIG. 12). Generally speaking, the printer specifying unit 350 may specify one printer to have high priority, among a plurality of printers included in an area, based on the related information (for example, performance information such as print speeds, information related to executable printing conditions, and location information 223) related to the plurality of printers included in the area.

(4) In the above described embodiments, the location information 223 and the area information 222 area stored in the printers 200A to 200D. Alternatively, in a computer different from the printers 200, for example, in a management server, the location information 223 and the area information 222 of the plurality of printers 200A to 200D included in the system may be stored (registered). Similarly, specification information representing printing conditions which can be executed by the plurality of printers 200A to 200D included in the system may be stored in the management server. In this case, in the printing process or the specification information acquiring process, the portable terminal 400 may acquire the location information 223, the area information 222, or the specification information by inquiring of the management server. Also, the management server may be a server connected to the Internet, or may be a local server disposed in the LAN 80. However, like in the above described embodiments, if those information are stored in the printers 200A to 200C, since it is unnecessary to install the management system, it is possible to more easily establish a system capable of making an appropriate printer to perform printing.

(5) In the above described first embodiment, in the location registering process, the current position information is transmitted to the printers 200 by use of NFC, and other inter-apparatus communications (communication between a printer 200 and the portable terminal 400, and communication between printers 200) are performed by use of wireless communication (the infrastructure mode) using the access points 50A to 50C (FIG. 1). These inter-apparatus communications may be performed by use of any other communication means. As other communication means, for example, wireless communication in an ad hoc mode, or wireless communication such as Bluetooth (registered as a trademark), infrared communication, or TransferJet (registered as a trademark) can be used.

(6) In the above described first embodiment, the area information 222 is transmitted from the portable terminal 400 to the printers 200 by use of wireless communication, thereby being registered in the printers 200. Alternatively, for example, the user may input a plurality of position information (for example, the four pieces of position information representing the positions of the four positions P1 to P4 of FIG. 2) acquired by use of the portable terminal 400 or a device different from the portable terminal 400 and having a GPS function, through the operation units 260 of the printers 200, thereby registering the area information 222 in the printers 200.

(7) In the above described second embodiment, in the printing process, like when the owner of the portable terminal 400 is User 1 of FIG. 18, when the portable terminal 400 is positioned in a plurality of areas ("NO" in STEP S925 of FIG. 15), among printers 200 included in an area selected through the selection receiving image SG3 (FIG. 17) by the user, a printer closest to the portable terminal 400 is specified as a printer to be instructed to perform printing (STEP S930 or S955 of FIG. 18). Alternatively, among printers included in the plurality of areas, a printer closest to the portable terminal 400 may be automatically specified as a printer to be instructed to perform printing, without receiving the selection by the user.

(8) In the above described second embodiment, the first area A1 and the third area A3 (FIG. 18) are set to completely overlap with each other, and the first area A1 and the second area A2 are set to be completely separate from each other. Alternatively, a plurality of areas may be set to partially overlap with each other. In this case, with respect to the plurality of areas, one printer disposed in the partial overlap area may be associated. Alternatively, with respect to the plurality of areas, printers different from each other may be associated, respectively.

(9) In the above described first embodiment, the print instructing unit 360 transmits a print job including print image data, as a print instruction. For example, when the portable terminal 400 has stored image data in a management server or the like, the print instructing unit 360 of the portable terminal 400 may transmit a print instruction without any print image data, to a specified printer, and the printer having received the corresponding print instruction may access the management server, and acquire print image data from the management server.

(10) In the above described first embodiment, the print instructing unit 360 transmits a print job for a specified printer, directly to the specified printer. In a case of a system having a management server, alternatively, the print instructing unit 360 may transmit a print job for a specified printer, to the management server, and the management server may transmit the print job to the specified printer.

(11) In the above described first embodiment, the generating unit 317 of the portable terminal 400 generates the area information 222 and registers the area information 222 in the printers 200. Alternatively, for example, the area information 222 may be generated by a device other than the portable terminal 400. For example, a personal computer may be used to generate the area information 222, for example, with reference to floor maps in which office floors and coordinate systems of latitudes, longitudes, and the like are associated with each other. Also, with reference to these floor maps, the coordinate information of positions defining areas may be calculated, and then the user may input the calculated coordinate information to the printers 200 by use of the operation units 260, and the printers 200 may generate the area information 222.

(12) In the above described first embodiment, the location information 223 is stored in each printer 200. However, the location information 223 need not be stored in the printer 200. For example, the location information 223 may be stored in the portable terminal 400. In this case, for example, in the area information registering process or the area information setting process, each printer 200 cannot confirm whether the location of the corresponding printer 200 is in an area defined by the area information 222 to be registered. In this case, after the user confirms that the location of the corresponding printer 200 is in the area defined by the area information 222 to be registered, the area information 222 may be registered in the corresponding printer 200. Also, in the printing process, the printer specifying unit 350 of the portable terminal 400 specifies a printer closest to the portable terminal 400, among a plurality of printers 200 included in the area. Alternatively, on the basis of the location information 223 of the individual printers stored in the portable terminal 400 in advance, the printer specifying unit 350 may specify a printer closest to the portable terminal 400, among a plurality of printers 200 included in an area.

(13) In the above described embodiments, some components implemented by hardware may be replaced by software, and conversely, some components implemented by software may be replaced by hardware.

(14) When some or all of the functions of the present invention are implemented by software, the software (computer program) can be stored on a computer-readable recording medium. The computer-readable recording medium is not limited to a portable recording medium such as a memory card and a CD-ROM, but may include various internal storage devices such as a RAM and a ROM built in a computer, and external storage devices such as a hard disk drive connected to a computer.

Although embodiments and modifications of the present invention are described above, the embodiments are provided for the purpose of helping better understanding of the present invention but do not limit the scope of the present invention. The present invention may include alterations, changes, and modifications of the embodiments without departing from the gist of the present invention and the scope of claims, and also includes equivalents thereof.

The present invention provides illustrative, non-limiting aspects as follows:

(1) In a first aspect, there is provided a terminal device configured to support selection of a printer, the terminal device including: a first processor; and a first memory storing instructions that, when executed by the processor, causes the terminal device to perform: registering area information which defines an area including a location of a printer and is for associating the area with the printer located in the area; acquiring the registered area information; acquiring terminal position information which represents the position of the terminal device; and specifying a candidate of a printer to be used based on the area information and the terminal position information, wherein the area is defined based on three or more positions.

According to the first aspect, a candidate for a printer to be used can be appropriately specified based on the area information defining the area including the location of the printer, and the terminal position information. Also, since the area including the location of the printer is defined based on three or more positions, it is possible to register an appropriate area for specifying the candidate for a printer to be used.

(2) In a second aspect, there is provided the terminal device according to the first aspect, wherein the registering of the area information includes generating the area information defining the area based on the three or more positions.

According to the second aspect, since the terminal device generates the area information, the terminal device can easily register the area information.

(3) In a third aspect, there is provided the terminal device according to the second aspect, wherein the generating of the area information includes receiving a specific operation from a user, wherein the generating of the area information includes acquiring information, which represents the position of the terminal device at the time when the specific operation is received, as information representing one position of the three or more positions, and wherein the generating of the area information generates the area information based on the acquired information representing the position of the terminal device.

According to the third aspect, since it is possible to use the terminal device to easily register the information representing the positions, it is possible to easily generate an area information defining an area defined based on three or more positions.

(4) In a fourth aspect, there is provided the terminal device according to any one of the first to third aspects, wherein the registering of the area information registers, first area information which defines a first area based on a first position group and is for associating the first area with a first printer located in the first area, and second area information which defines a second area based on a second position group and is for associating the second area with a second printer located in the second area.

According to the fourth aspect, with respect to each of the first printer and the second printer, it is possible to register an appropriate area for specifying candidates for a printer to be used.

(5) in a fifth aspect, there is provided the terminal device according to any one of the first to fourth aspects, wherein the registering of the area information registers, third area information which defines a third area based on a third position group and is for associating the third area with a third printer located in the third area, and fourth area information which defines a fourth area based on a fourth position group and is for associating the fourth area with a fourth printer located in the fourth area, and wherein the third area overlaps with at least a partial area of the fourth area, the partial area including the location of the third printer.

According to the fifth aspect, since it is possible to register a plurality of area information defining a plurality of areas to be associated with one printer, it is possible to flexibly set areas to be associated with one printer.

(6) In a sixth aspect, there is provided the terminal device according to any one of the first to fifth aspects, wherein the instructions stored in the first memory, when executed by the first processor, cause the terminal device to perform: acquiring condition information representing a printing condition which the printer located in the area defined by the area information can execute, wherein the specifying of the candidate of the printer to be used is specified based on the condition information.

According to the sixth aspect, since the candidate for a printer to be used is specified based on the condition information representing a printing condition which the printers can execute, it is possible to specify an appropriate printer according to the printing condition.

(7) In a seventh aspect, there is provided the terminal device according to the sixth aspect, wherein the instructions stored in the first memory, when executed by the first processor, causes the terminal device to perform: determining whether the terminal device is positioned in the area defined by the area information, based on the area information and the terminal position information, wherein, when the terminal device is not positioned in the area defined by the area information, the acquiring of the condition information acquires the condition information related to the printer located in the area defined by the area information.

According to the seventh aspect, even when the terminal device is not positioned in any area, an appropriate printer can be specified based on the condition information.

(8) In an eighth aspect, there is provided the terminal device according to any one of the first to seventh aspects, wherein the registering of the area information registers the area information in the printer to be associated with the area defined by the area information.

According to this the eighth aspect, since the area information is acquired from the printer, it is possible to easily establish a printing system, for example, without installing a management server.

(9) In a ninth aspect, there is provided the terminal device according to any one of the first to eighth aspects, wherein the registering of the area information registers the area information in a computer different from a printer associated with the area information, in association with printer identification information identifying the printer associated with the area information.

According to the ninth aspect, even when a comparatively large number of printers are included, it is possible to use the computer to easily manage the area information for the comparatively large number of printers.

(10) In a tenth aspect, there is provided a specific printer configured to perform communication with the terminal device according to any one of the first to ninth aspects, the specific printer including: a second processor; and a second memory storing instructions that, when executed by the processor, cause the specific printer to perform: acquiring area information corresponding to another printer which is different from the specific printer and has already registered the area information therein; and setting the area information corresponding to the another printer as area information corresponding to the specific printer, when the specific printer is located in an area defined by the area information corresponding to the another printer.

According to the tenth aspect, it is possible to easily set the area information corresponding to the specific printer based on the area information corresponding to the other printer.

(11) In an eleventh aspect, there is provided the specific printer according to the tenth aspect, wherein the acquiring of the area information corresponding to the another printer acquires a plurality of pieces of area information corresponding to a plurality of another printers, and wherein the instructions stored in the second memory, when executed by the second processor, cause the specific printer to perform: displaying information related to the plurality of areas respectively defined by the plurality of pieces of acquired area information, when the specific printer is located in the plurality of areas respectively defined by the plurality of pieces of acquired area information.

According to the eleventh aspect, it is possible to make the user recognize that the printer is positioned in a plurality of areas.

(12) In a twelfth aspect, there is provided a non-transitory computer-readable storage medium storing computer-readable instructions, when executed by a processor, causing a terminal device configured to support selection of a printer to perform: registering area information which defines an area including a location of a printer and is for associating the area with the printer located in the area; acquiring the registered area information; acquiring terminal position information which represents the position of the terminal device; and specifying a candidate of a printer to be used based on the area information and the terminal position information, wherein the area is defined based on three or more positions.

What is claimed is:

1. A terminal device configured to support selection of a printer, the terminal device comprising:
a global positioning system (GPS) module configured to receive a GPS signal;
a first processor; and
a first memory storing instructions that, when executed by the first processor, cause the terminal device to perform:
registering area information which defines an area including a location of the printer and is for associating the area with the printer located in the area, the registering of the area information including generating the area information;
acquiring the registered area information;
acquiring terminal position information which represents a position of the terminal device; and
specifying that the printer is to be used based on the area information and the terminal position information,
wherein the generating of the area information includes:
acquiring, in a case where a first specific operation is received when the terminal device is at a first position, information which represents a current position of the terminal device at the first position by using the GPS module;
acquiring, in a case where a second specific operation is received when the terminal device is at a second position different from the first position after the information which represents the current position of the terminal device at the first position has been acquired, information which represents a current position of the terminal device at the second position by using the GPS module; and
acquiring, in a case where a third specific operation is received when the terminal device is at a third position different from the first position and the second position after the information which represents the current position of the terminal device at the second position has been acquired, information which represents a current position of the terminal device at the third position by using the GPS module, and
wherein the registering of the area information comprises registering, in a case where a registering process is instructed from a user, one area which is defined based on three or more different positions including the first position, the second position, and the third position.

2. The terminal device according to claim 1,
wherein the registering of the area information comprises:
registering first area information which defines a first area based on a first position group and is for associating the first area with a first printer located in the first area, and
registering second area information which defines a second area based on a second position group and is for associating the second area with a second printer located in the second area.

3. The terminal device according to claim 2,
wherein the first area overlaps with at least a partial area of the second area, the partial area including the location of the first printer.

4. The terminal device according to claim 1,
wherein the instructions stored in the first memory, when executed by the first processor, cause the terminal device to perform:
acquiring condition information representing a printing condition which the printer located in the area defined by the area information can execute,
wherein the specifying that the printer is to be used is based on the condition information.

5. The terminal device according to claim 4,
wherein the instructions stored in the first memory, when executed by the first processor, cause the terminal device to perform:
determining whether the terminal device is positioned in the area based on the area information and the terminal position information,
wherein the acquiring of the condition information comprises acquiring the condition information related to the printer located in the area after determining that the terminal device is not positioned in the area.

6. The terminal device according to claim 1,
wherein the registering of the area information comprises registering the area information in the printer to be associated with the area defined by the area information.

7. The terminal device according to claim 6,
wherein the registering the area information in the printer to be associated with the area defined by the area information comprises performing communication with the printer using a near field communication.

8. The terminal device according to claim 1,
wherein the registering of the area information comprises registering the area information, in a computer different from the printer associated with the area information, in association with printer identification information identifying the printer associated with the area information.

9. A non-transitory computer-readable storage medium storing computer-readable instructions, when executed by a processor, causing a terminal device configured to support selection of a printer to perform:
registering area information which defines an area including a location of the printer and is for associating the area with the printer located in the area, the registering of the area information including generating the area information;
acquiring the registered area information;
acquiring terminal position information which represents a position of the terminal device; and
specifying that the printer is to be used based on the area information and the terminal position information,
wherein the generating of the area information includes:
acquiring, in a case where a first specific operation is received when the terminal device is at a first position, information which represents a current position of the terminal device at the first position by using a global positioning system (GPS) module;
acquiring, in a case where a second specific operation is received when the terminal device is at a second position different from the first position after the information which represents the current position of the terminal device at the first position has been acquired, information which represents a current position of the terminal device at the second position by using the GPS module; and
acquiring, in a case where a third specific operation is received when the terminal device is at a third position different from the first position and the second position after the information which represents the current position of the terminal device at the second position has been acquired, information which represents a current position of the terminal device at the third position by using the GPS module, and wherein the registering of the area information comprises registering, in a case where a registering process is instructed from a user, one area which is defined based on three or more different positions including the first position, the second position, and the third position.

10. The non-transitory computer-readable storage medium of claim 9, wherein the computer-readable instructions, when executed, further cause the terminal device to perform:

registering second area information which defines a second area based on three or more different positions of the terminal, wherein the second area is different from the area.

11. The non-transitory computer-readable storage medium of claim 10, wherein the second area overlaps with a part of the area.

* * * * *